(12) United States Patent
Fujimura

(10) Patent No.: US 6,842,741 B1
(45) Date of Patent: Jan. 11, 2005

(54) RECORDING MEDIUM WITH ELECTRONIC TICKET DEFINITIONS RECORDED THEREON AND ELECTRONIC TICKET PROCESSING METHODS AND APPARATUSES

(75) Inventor: Ko Fujimura, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/372,593

(22) Filed: Aug. 12, 1999

(30) Foreign Application Priority Data

Dec. 8, 1998 (JP) ............................................ 10/228293

(51) Int. Cl.[7] ................................................. G07F 7/08
(52) U.S. Cl. .............................. 705/59; 705/1; 705/50; 705/51; 705/52; 705/53; 705/54; 705/55; 705/56; 705/57; 705/58; 707/1; 707/2; 707/3; 707/4; 707/5; 707/6; 707/7; 707/8; 707/9; 707/10
(58) Field of Search .............................. 705/59, 50, 51, 705/52, 53, 54, 35, 56, 57, 58, 1; 463/17, 16; 707/1, 2, 3, 4, 5, 6, 7, 8, 9, 10; 235/33, 31 R, 31 T

(56) References Cited

U.S. PATENT DOCUMENTS

| 5,754,654 A | * | 5/1998 | Hiroya et al. | .................. 705/59 |
| 6,236,971 B1 | * | 5/2001 | Stefuk et al. | .................. 705/59 |

FOREIGN PATENT DOCUMENTS

| EP | 0 823 694 | 2/1998 |
| EP | 0 829 828 | 3/1998 |
| GB | 2317790 | 4/1998 |
| NL | EP 0 829 828 A1 | * 9/1996 | ............. G07F/7/08 |
| NL | EP 0 823 694 A1 | * 11/1998 | ............. G07F/7/08 |

OTHER PUBLICATIONS

The Future of Cards in Payment (Subscriber identity module cards in cellular phones are becoming more popular in Denmark, the expense of payment cards) (Card Technology, vol.: 2, No.: 10, p.: 56+, Oct. 2001).*
Ticketmaster Adds Cultural Events in 1,500 Cities (Rob Conlin, E–Commerce Times, Jan. 4, 2000).*
Etix.com Delivers Print–at–Home Capabilities for Tickets You Buy on the Web (Business Wire, Jun. 27, 2000).*
New distribution era awaits industyr; firms queue up to offer electronic ticket delivery. (Buisness Travel Update) (Lassiter, Eric, Travel Weekly, vol.: 49, No.: 71, p.: 21 (2), Sep. 3, 1990).*
Electronic Commerce: Elements of EC Technology of Hideo HIYAMA (Sep. 1997).
XML/SGML Saloon (May 15, 1998 issue).

* cited by examiner

Primary Examiner—James P. Trammell
Assistant Examiner—C Owen Sherr
(74) Attorney, Agent, or Firm—Connolly Bove Lodge & Hutz LLP

(57) ABSTRACT

An electronic ticket comprises a ticket ID 233, an issuer ID 237, right information 239 of the electronic ticket, and issue, transfer and redeem conditions 240, 241 and 242, the entire block of these pieces of information being attached with an issuer's signature 235. In each of the issue, transfer and redeem conditions there are recorded ticket schema ID's which specify the types of tickets that the ticket sender and receiver are required to possess, and in each phase of the issue, transfer and redeem transactions it is verified whether these conditions are satisfied.

9 Claims, 32 Drawing Sheets

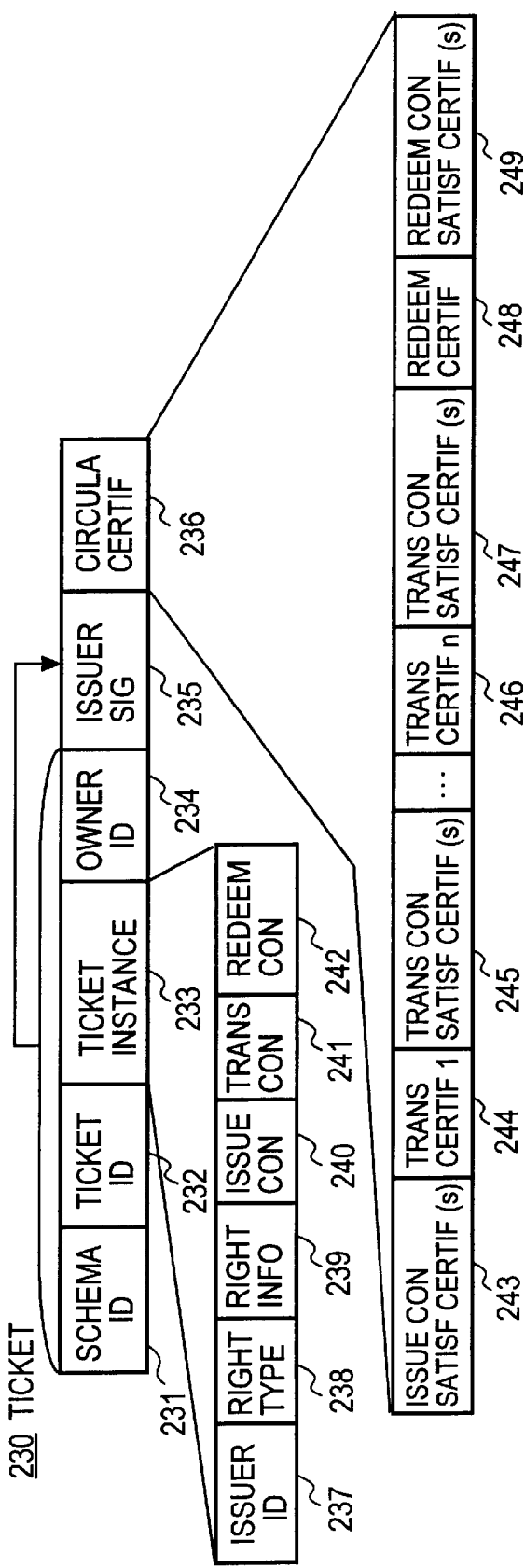
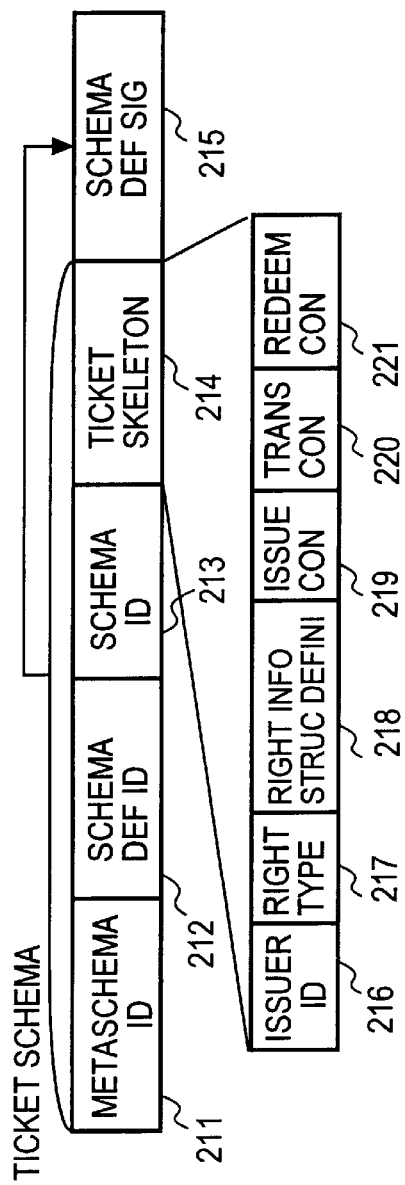
FIG. 2A
FIG. 2B

FIG. 3A
250 ISSUE CONDITION
| SENDER REQ'D TICKET SCHEMA ID(s) | RECEIVER REQ'D TICKET SCHEMA ID(s) |
|---|---|
| 251 | 252 |
FIG. 3B
260 TRANSFER CONDITION
| TRANSFER-ABILITY | SENDER REQ'D TICKET SCHEMA ID(s) | RECEIVER REQ'D TICKET SCHEMA ID(s) |
|---|---|---|
| 261 | 262 | 263 |
FIG. 3C
270 REDEEM CONDITION
| EXPIRY DATE | VALID NO. OF TIMES | ORDER-LINESS | SENDER REQ'D TICKET SCHEMA ID(s) | RECEIVER REQ'D TICKET SCHEMA ID(s) |
|---|---|---|---|---|
| 271 | 272 | 273 | 274 | 275 |
FIG. 3D
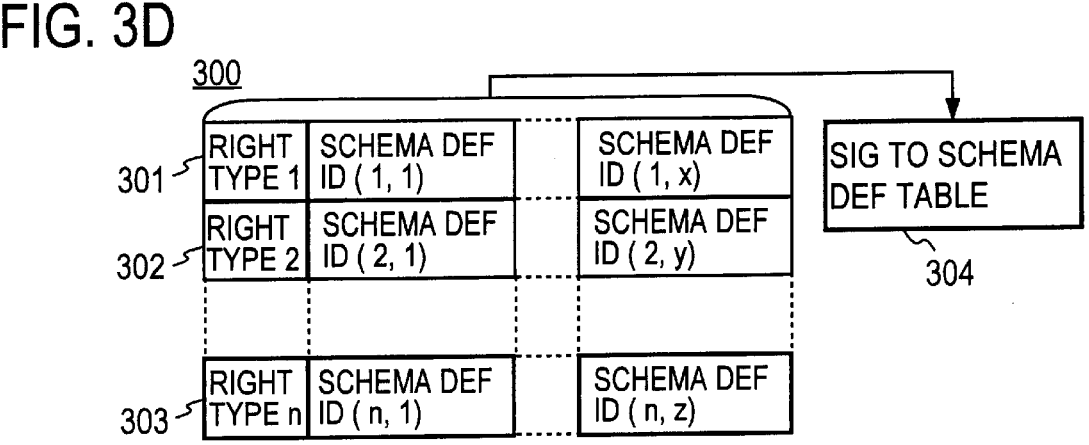
FIG. 3E
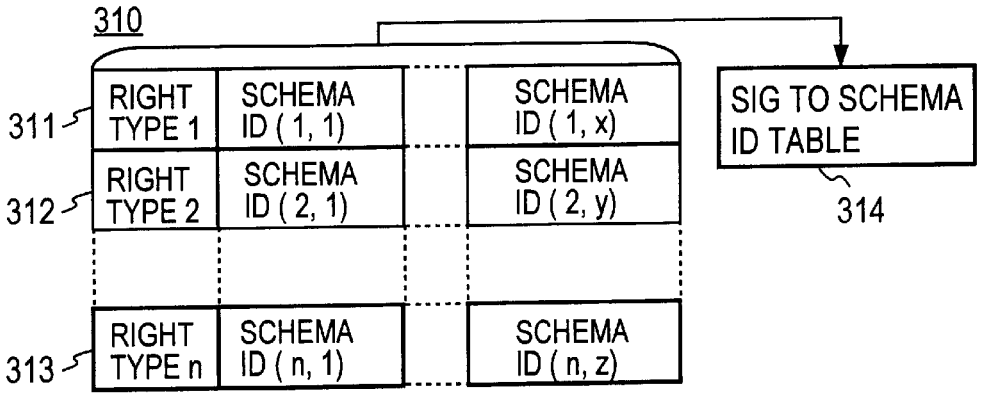

FIG. 4

400 LOTTERY TICKET ISSUER CERTIFICATE

| PROPERTIES | | | VALUES (EXAMPLE) | |
|---|---|---|---|---|
| SCHEMA ID | | | http://a-ministry.go.jp/lottery/issuer-cert | 401 |
| TICKET ID | | | 00023134 | 402 |
| TICKET INSTANCE | ISSUER ID (PK) | | 3a2Bfyo9w8sLiW4u2L3e2Xsl9 | 403 |
| | RIGHT TYPE | | LOTTERY ISSUER CERTIFICATE | 404 |
| | RIGHT INFO | | GRANT ISSUANCE OF LOTTERY | 405 |
| | ISSUE CON | SENDER REQ'D TICKET SCHM ID | | |
| | | RECEIVER REQ'D TICKET SCHM ID | | |
| | TRANS CON | TRANSFERABILITY | NO | 408 |
| | | SENDER REQ'D TICKET SCHM ID | | |
| | | RECEIVER REQ'D TICKET SCHM ID | | |
| | REDEEM CON | VALID | FROM | 01.01.1998 | 411 |
| | | | TO | 31.12.1998 | 412 |
| | | VALID NO. OF TIMES | UNLIMITED | 413 |
| | | ORDERLINESS | | |
| | | SENDER REQ'D TICKET SCHM ID | | |
| | | RECEIVER REQ'D TICKET SCHM ID | | |
| OWNER ID (PK) | | | we21A3aXfyo9slubL398sLiWo | 417 |
| ISSUER SIG | | | 1Afyo9we23aXsl8sLiWoubL39 | 418 |
| CIRCULA CERTIF | | | | |

FIG. 5

500 LOTTERY TICKET ISSUER CERTIFICATE SCHEMA

| PROPERTIES | | | VALUES (EXAMPLE) | |
|---|---|---|---|---|
| METASCHEMA ID | | | #system | 501 |
| SCHM DEF ID (PK) | | | 3a2Bfyo9w8sLiW4u2L3e2Xsl9 | 502 |
| SCHEMA ID | | | http://a-ministry/lottery/issuer-cert | 503 |
| TICKET SKELETON | ISSUER ID (PK) | | 3a2Bfyo9w8sLiW4u2L3e2Xsl9 | 504 |
| | RIGHT TYPE | | LOTTERY ISSUER CERTIFICATE | 505 |
| | RIGHT INFO | | GRANT ISSUANCE OF LOTTERY | 506 |
| | ISSUE CON | SENDER REQ'D TICKET SCHM ID | | |
| | | RECEIVER REQ'D TICKET SCHM ID | | |
| | TRANS CON | TRANSFERABILITY | NO | 509 |
| | | SENDER REQ'D TICKET SCHM ID | | |
| | | RECEIVER REQ'D TICKET SCHM ID | | |
| | REDEEM CON | VALID | FROM | * | 512 |
| | | | TO | * | 513 |
| | | VALID NO. OF TIMES | UNLIMITED | 514 |
| | | ORDERLINESS | | |
| | | SENDER REQ'D TICKET SCHM ID | | |
| | | RECEIVER REQ'D TICKET SCHM ID | | |
| SCHM DEF SIG | | | 2Bfyo9we23aXsl8sLiW4u2L39 | 518 |

FIG. 6

600 USER CERTIFICATE

| PROPERTIES | | | VALUES (EXAMPLE) | |
|---|---|---|---|---|
| SCHEMA ID | | | http://system.ticket.or.jp/user-reg-cert | 601 |
| TICKET ID | | | 00023134 | 602 |
| TICKET INSTANCE | ISSUE CON | ISSUER ID (PK) | 19wiW4u2Lo23aX73eAfy78sL9 | 603 |
| | | RIGHT TYPE | USER CERTIFICATE | 604 |
| | | RIGHT INFO | ACKNOWLEDGE REGIST'D USER | 605 |
| | | SENDER REQ'D TICKET SCHM ID | | |
| | | RECEIVER REQ'D TICKET SCHM ID | | |
| | TRANS CON | TRANSFERABILITY | NO | 608 |
| | | SENDER REQ'D TICKET SCHM ID | | |
| | | RECEIVER REQ'D TICKET SCHM ID | | |
| | REDEEM CON | VALID FROM | 01.01.1998 | 611 |
| | | VALID TO | 31.12.1998 | 612 |
| | | VALID NO. OF TIMES | UNLIMITED | 613 |
| | | ORDERLINESS | | |
| | | SENDER REQ'D TICKET SCHM ID | | |
| | | RECEIVER REQ'D TICKET SCHM ID | | |
| OWNER ID (PK) | | | 2Btyo9we23aX956sLiw4u2444 | 617 |
| ISSUER SIG | | | 1Afy78sLiW4u2Lo9we23aX739 | 618 |
| CIRCULA CERTIF | | | | |

FIG. 7

700 USER CERTIFICATE SCHEMA

| PROPERTIES | | | VALUES (EXAMPLE) | |
|---|---|---|---|---|
| METASCHEMA ID | | | #system | 701 |
| SCHM DEF ID (PK) | | | u2Lo2eAfy78sL913aX739wiW4 | 702 |
| SCHEMA ID | | | http://system.ticket.or.jp/user-reg-cert | 703 |
| TICKET SKELETON | | ISSUER ID (PK) | 19wiW4u2Lo23aX73eAfy78sL9 | 704 |
| | | RIGHT TYPE | USER CERTIFICATE | 705 |
| | | RIGHT INFO | ACKNOWLEDGE REGIST'D USER | 706 |
| | ISSUE CON | SENDER REQ'D TICKET SCHM ID | | |
| | | RECEIVER REQ'D TICKET SCHM ID | | |
| | TRANS CON | TRANSFERABILITY | NO | 709 |
| | | SENDER REQ'D TICKET SCHM ID | | |
| | | RECEIVER REQ'D TICKET SCHM ID | | |
| | REDEEM CON | VALID | FROM | * | 712 |
| | | | TO | * | 713 |
| | | VALID NO. OF TIMES | UNLIMITED | 714 |
| | | ORDERLINESS | | |
| | | SENDER REQ'D TICKET SCHM ID | | |
| | | RECEIVER REQ'D TICKET SCHM ID | | |
| SCHM DEF SIG | | | 2Bfyo9we23aXsl8sLiW4u2L39 | 718 |

FIG. 8

800 REDEEM CERTIFICATE

| PROPERTIES | | | VALUES (EXAMPLE) | |
|---|---|---|---|---|
| SCHEMA ID | | | #sys-comsumed-cert | 801 |
| TICKET ID | | | 00023134 | 802 |
| TICKET INSTANCE | | ISSUER ID (PK) | Wo9e21A3aXwfyubL38sLio9sl | 803 |
| | | RIGHT TYPE | REDEEM CERTIFICATE | 804 |
| | | RIGHT INFO | SCHM ID=http://a-company.com/s1<br>TICKET ID=00012345<br>REMAINING VALID NO. OF TIMES=0<br>DATE=15.06.1998 | 805 |
| | ISSUE CON | SENDER REQ'D TICKET SCHM ID | | |
| | | RECEIVER REQ'D TICKET SCHM ID | | |
| | TRANS CON | TRANSFERABILITY | NO | 808 |
| | | SENDER REQ'D TICKET SCHM ID | | |
| | | RECEIVER REQ'D TICKET SCHM ID | | |
| | REDEEM CON | VALID | FROM | |
| | | | TO | |
| | | VALID NO. OF TIMES | UNLIMITED | 813 |
| | | ORDERLINESS | | |
| | | SENDER REQ'D TICKET SCHM ID | | |
| | | RECEIVER REQ'D TICKET SCHM ID | | |
| OWNER ID (PK) | | | e21A3aXfywsluo9bL398sLiWo | 817 |
| ISSUER SIG | | | 1Afyo9we23aXsl8sLiWoubL39 | 818 |
| CIRCULA CERTIF | | | | |

FIG. 9

900 REDEEM CERTIFICATE SCHEMA

| PROPERTIES | | | VALUES (EXAMPLE) | |
|---|---|---|---|---|
| METASCHEMA ID | | | #system | 901 |
| SCHM DEF ID (PK) | | | 34u2Lw8sLiW3ea2Bfyo92Xsl9 | 902 |
| SCHEMA ID | | | #sys-consumed-cert | 903 |
| TICKET SKELETON | | ISSUER ID (PK) | * | 904 |
| | | RIGHT TYPE | REDEEM CERTIFICATE | 905 |
| | | RIGHT INFO | SCHEMA ID = *<br>TICKET ID = *<br>REMAINING VALID NO. OF TIMES = *<br>DATE = * | 906 |
| | ISSUE CON | SENDER REQ'D TICKET SCHM ID | | |
| | | RECEIVER REQ'D TICKET SCHM ID | | |
| | TRANS CON | TRANSFERABILITY | NO | 909 |
| | | SENDER REQ'D TICKET SCHM ID | | |
| | | RECEIVER REQ'D TICKET SCHM ID | | |
| | REDEEM CON | VALID | FROM | | |
| | | | TO | | |
| | | VALID NO. OF TIMES | UNLIMITED | 914 |
| | | ORDERLINESS | | |
| | | SENDER REQ'D TICKET SCHM ID | | |
| | | RECEIVER REQ'D TICKET SCHM ID | | 918 |
| SCHM DEF SIG | | | 2Bfyo9we23aXsl8sLiW4u2L39 | |

FIG. 10

1000 TRANSFER CERTIFICATE

| PROPERTIES | | | VALUES (EXAMPLE) | |
|---|---|---|---|---|
| SCHEMA ID | | | #sys-transferred-cert | 1001 |
| TICKET ID | | | 00013423 | 1002 |
| TICKET INSTANCE | | ISSUER ID (PK) | sl8sLiL391AfyW4u2o9we23aX | 1003 |
| | | RIGHT TYPE | TRANSFER CERTIFICATE | 1004 |
| | ISSUE CON | RIGHT INFO | TRANS'D TICKET SCHM ID= http://a-company.com/s1  TRANS'D TICKET ID=00012345 DATE =15.06.1998 | 1005 |
| | | SENDER REQ'D TICKET SCHM ID | | |
| | | RECEIVER REQ'D TICKET SCHM ID | | |
| | TRANS CON | TRANSFERABILITY | NO | 1008 |
| | | SENDER REQ'D TICKET SCHM ID | | |
| | | RECEIVER REQ'D TICKET SCHM ID | | |
| | REDEEM CON | VALID FROM | | |
| | | VALID TO | | |
| | | VALID NO. OF TIMES | UNLIMITED | 1013 |
| | | ORDERLINESS | | |
| | | SENDER REQ'D TICKET SCHM ID | | |
| | | RECEIVER REQ'D TICKET SCHM ID | | |
| OWNER ID (PK) | | | 1Afyo9we23aXsl8sLiW4u2L39 | 1017 |
| ISSUER SIG | | | W4u2L39Xsl8s1Afyo9we23aLi | 1018 |
| CIRCULA CERTIF | | | | |

FIG. 11

1100 TRANSFER CERTIFICATE SCHEMA

| PROPERTIES | | | VALUES (EXAMPLE) | |
|---|---|---|---|---|
| METASCHEMA ID | | | #system | 1101 |
| SCHM DEF ID (PK) | | | 91Afyo9w8sLiW4u2L3e23aXsl | 1102 |
| SCHEMA ID | | | #sys-transferred-cert | 1103 |
| TICKET SKELETON | | ISSUER ID (PK) | * | 1104 |
| | | RIGHT TYPE | TRANSFER CERTIFICATE | 1105 |
| | | RIGHT INFO | TRANS'D TICKET SCHM ID = * <br> TRANS'D TICKET ID = * <br> DATE = * | 1106 |
| | ISSUE CON | SENDER REQ'D TICKET SCHM ID | | |
| | | RECEIVER REQ'D TICKET SCHM ID | | |
| | TRANS CON | TRANSFERABILITY | NO | 1109 |
| | | SENDER REQ'D TICKET SCHM ID | | |
| | | RECEIVER REQ'D TICKET SCHM ID | | |
| | REDEEM CON | VALID — FROM | | |
| | | VALID — TO | | |
| | | VALID NO. OF TIMES | UNLIMITED | 1114 |
| | | ORDERLINESS | | |
| | | SENDER REQ'D TICKET SCHM ID | | |
| | | RECEIVER REQ'D TICKET SCHM ID | | |
| SCHM DEF SIG | | | 9we23aXsl8sLiW4u2L391Afyo | 1118 |

FIG. 12

1200 LOTTERY TICKET

| PROPERTIES | | | VALUES (EXAMPLE) | |
|---|---|---|---|---|
| SCHEMA ID | | | http://a-minstry.go.jp/lottery-ticket.sch | 1201 |
| TICKET ID | | | 00023134 | 1202 |
| TICKET INSTANCE | ISSUER ID (PK) | | 23aXsl8s1Afyo9w4u2L39eLiW | 1203 |
| | RIGHT TYPE | | LOTTERY TICKET | 1204 |
| | RIGHT INFO | | NUMBER=1234-3333-4534<br>DATE OF DRAWING=1999-03-03 | 1205 |
| | ISSUE CON | SENDER REQ'D TICKET SCHM ID | http://a-minstry.go.jp/lottery/issuer-cert | 1206 |
| | | RECEIVER REQ'D TICKET SCHM ID | http://system.ticket.or.jp/user-reg-cert | 1207 |
| | TRANS CON | TRANSFERABILITY | NO | 1208 |
| | | SENDER REQ'D TICKET SCHM ID | | |
| | | RECEIVER REQ'D TICKET SCHM ID | | |
| | REDEEM CON | VALID | FROM | 03.03.1999 | 1211 |
| | | | TO | 02.03.2000 | 1212 |
| | | VALID NO. OF TIMES | ONE | 1213 |
| | | ORDERLINESS | | |
| | | SENDER REQ'D TICKET SCHM ID | http://system.ticket.or.jp/user-reg-cert | 1215 |
| | | RECEIVER REQ'D TICKET SCHM ID | http://a-bank.co.jp/exchange-office-cert | 1216 |
| OWNER ID (PK) | | | e2W4u2L391Afyo9w3aXsl8sLi | 1217 |
| ISSUER SIG | | | 1Afyo9we23aXsl8sLiW4u2L39 | 1218 |
| CIRCULA CERTIF | | | (ISSUER CERTIFICATE : FIG. 4) | 1219 |

FIG. 13

1300 LOTTERY TICKET SCHEMA

| PROPERTIES | | | VALUES (EXAMPLE) | |
|---|---|---|---|---|
| METASCHEMA ID | | | #system | 1301 |
| SCHM DEF ID (PK) | | | 23aXsl8sLiW4u2L391Afyo9we | 1302 |
| SCHEMA ID | | | http://a-minstry.go.jp/lottery-ticket.sch | 1303 |
| TICKET SKELETON | | ISSUER ID (PK) | * | 1304 |
| | | RIGHT TYPE | LOTTERY TICKET | 1305 |
| | | RIGHT INFO | NUMBER = *<br>DATE OF DRAWING = * | 1306 |
| | ISSUE CON | SENDER REQ'D TICKET SCHM ID | http://a-minstry.go.jp/lottery/issuer-cert | 1307 |
| | | RECEIVER REQ'D TICKET SCHM ID | http://system.ticket.or.jp/user-reg-cert | 1308 |
| | TRANS CON | TRANSFERABILITY | NO | 1309 |
| | | SENDER REQ'D TICKET SCHM ID | | |
| | | RECEIVER REQ'D TICKET SCHM ID | | |
| | REDEEM CON | VALID | FROM | * | 1312 |
| | | | TO | * | 1313 |
| | | VALID NO. OF TIMES | ONE | 1314 |
| | | ORDERLINESS | | |
| | | SENDER REQ'D TICKET SCHM ID | http://system.ticket.or.jp/user-reg-cert | 1316 |
| | | RECEIVER REQ'D TICKET SCHM ID | http://a-bank.co.jp/exchange-office-cert | 1317 |
| SCHM DEF SIG | | | e23aXsl8sLiW4u2L391Afyo9w | 1318 |

RECORDING MEDIUM WITH ELECTRONIC TICKET DEFINITIONS RECORDED THEREON AND ELECTRONIC TICKET PROCESSING METHODS AND APPARATUSES

BACKGROUND OF THE INVENTION

The present invention relates to a method and apparatus for securely circulating electronic tickets composed of digital information which need to be protected from duplicate redemption or fraud and, more particularly, to a method for circulating, by a general-purpose processing system, electronic tickets with various application-dependent circulation conditions such as issue and transfer conditions.

At present, software, images, news and so forth are already circulated using the Internet and similar electronic communication means, but any other goods that can be encoded as digital information can inherently be delivered or circulated electronically. In service industries, in particular, such a variety of tickets as listed below are circulated as commodities, and they can also be electronically circulated.

(1) Reservation Tickets

Concert ticket, Reserved seat ticket, Plane ticket, Hotel accommodation ticket, Ticket for booking to play tennis.

(2) Exchange Tickets

Bill of lading, Pawn ticket, Claim ticket, Title deed.

(3) Order Tickets

Admission-order ticket for a bargain counter, Queuing ticket for a customer to be served at a teller's window, Numbered ticket for medical care.

(4) Gift Certificates

Gift coupon, Beer coupon, Book coupon, Rice coupon, Restaurant coupon.

(5) Prepaid Cards

Telephone card, Prepaid card, Transportation pass, Expressway transportation pass.

(6) Permits

Driver's license, Passport, Gate card.

The ticket herein mentioned is a representation of the ticket owner's right to claim the services or goods written on the ticket. Such a ticket can be provided in electronic form by encoding the claim contents as digital information and attaching thereto the issuer's signature.

The electronization of the ticket offers an advantage which reduces the costs for issuing and mailing paper tickets. Another advantage is to raise the limitation to the place and time for selling tickets, making it possible to get and use tickets anytime and anywhere. Furthermore, a ticket can be transferred to a friend or acquaintance at a remote place over a network. The electronization of the ticket thus improves its usability. For these reasons, a trend toward the electronization of tickets has become active in recent years.

As for event tickets for concerts, sports games and so on, there already exist dealers who sell electronic tickets over the Internet like e-ticket (http://www.e-ticket.net/), for instance. As regards exchange tickets, too, there are dealers who sells exchange tickets for gold like e-gold (http://www.e-gold.com) of Gold & Silver Reserve, Inc. of the United States. For the electronization of gift coupons and prepaid cards, there have been proposed, for example, a prepaid card model based micropayment system described in S. Glassman, M. Manasse, M. Abadi, P. Gauthier, and P. Sobalvarro, "The Millicent Protocol for Inexpensive Electronic Commerce" (Proceedings of 4th World Wide Web Conference) and another prepaid-card-model-based ticket implementation method described in R. Rivest and Adi Shamir, "Pay Word and MicroMint: Two simple micropayment schemes" (Technical report, MIT, Cambridge, 1996).

Unlike digital contents such as an ordinary image and a sound, the ticket needs to be protected from double spending or similar fraud, and such fraud prevention schemes have been rapidly developed. Several schemes are proposed in the above-mentioned references, but in a reference on electronic cash technology, for example, Peter Wayner, "Digital Cash" (Academic Press Ltd. ISBN 0-12-788772-5), there are summarized methods for secure transfer and transaction of valuable information like electronic cash. In U.S. Pat. Nos. 5,621,797 and 5,557,518 there are proposed methods for secure redemption and transfer of electronic tickets, focusing on a transportation ticket, an event ticket, a communication service access ticket and a permit. Moreover, in Japanese Patent Application Laid-Open Gazette No. 31204/99 there is proposed an electronic ticket system that implements electronic tickets which are difficult to forge and duplicate but whose contents are provable to third parties.

However, these conventional schemes just mentioned above are intended only to protect the electronic ticket from fraud, and they do not propose a general-purpose method for defining a wide variety of electronic tickets nor do they offer a general-purpose processing system for issue, transfer and redeem transactions of diverse electronic tickets. There has not been yet studied any general-purpose electronic ticket circulation control method and apparatus which make it possible to control various circulation conditions such as listed below.

(1) Only qualified dealers or agents are allowed to issue tickets, e.g., lottery tickets and betting tickets.

(2) Tickets are issued (sold) only to qualified users, e.g., student discount transportation pass (that can be issued only to a person with a student identification card).

(3) Only qualified dealers and users are allowed to transfer (sell) tickets, e.g., plane tickets (that only travel agents can transfer).

(4) Only qualified users are allowed to redeem tickets, e.g., expressway tickets (requiring transportation tickets).

(5) Only qualified dealers are allowed to examine tickets, e.g., beer coupons and book coupons.

As described above, several electronic ticket processing methods and apparatuses have been proposed, but conventional systems are all those dedicated to individual applications. Conventionally, it is necessary, therefore, to develop ticket information readout software, a trading system and so forth for each ticket—this inevitably raises development costs. To solve this problem, there has been a strong demand for a general-purpose scheme of processing a wide variety of electronic tickets, but it has been difficult to implement a general-purpose ticket processing system because of diverse types and properties of electronic tickets.

SUMMARY OF THE INVENTION

It is therefore an object of the present invention to provide an electronic ticket definition method which enables to define of electronic tickets with diverse circulation conditions in generic manner, and a general-purpose electronic ticket processing method and apparatus which enable electronic tickets with various circulation conditions to be securely issued, transferred and redeemed.

According to the present invention, the electronic ticket includes a qualification condition defining part which specifies associated tickets to define various circulation conditions for its that the electronic ticket receiver and/or sender is required to meet in respective phases of issue, transfer and redeem of the electronic ticket—this makes it possible to circulate the electronic ticket in a wide variety of forms. The electronic ticket is adapted to define by itself the identifier of its issuer, its rights information, at least one of its issue, transfer and redeem conditions in said qualification condition defining part, and the identifier of its owner and the issuer's signature, and as a result, the electronic ticket will come into general use more easily.

And, a ticket schema that defines the information structure of the electronic ticket comprises a rights information structure definition that defines the kinds and meanings of properties or attributes of diverse rights information which vary for each application of the electronic ticket. The ticket schema has a definition to specify at least one of the electronic ticket issue, transfer and redeem conditions.

Moreover, the electronic ticket of the above structure has a definition to specify a schema identifier which defines the ticket schema of the above structure.

Furthermore, the electronic ticket of the above structure comprises a condition satisfaction certificate recording part which certifies the satisfaction of at least one of the ticket issue, transfer and redeem conditions to make it possible to verify, at the time of the electronic ticket being transferred or punched, that the ticket has been circulated so far through valid transactions.

An apparatus for issuing the above electronic ticket comprises: means for recording property values of the ticket according to the definition of the ticket schema; means for verifying the ticket issue condition recorded in a condition recording part; and means for sending the electronic ticket.

An apparatus for transferring the above electronic ticket comprises: means for verifying whether the ticket transfer condition is satisfied or not; means for recording a transfer certificate in a transfer certificate recording part when the transfer condition is met; and means for sending the electronic ticket to the transferee.

An apparatus for receiving the electronic ticket comprises: means for verifying whether an issue condition satisfaction certificate of the electronic ticket meets the issue condition recorded in an issue condition recording part; means for verifying the validity of the transfer certificate; and means for verifying whether a transfer condition satisfaction certificate satisfies the transfer condition recorded in a transfer condition recording part.

An apparatus for redeeming the electronic ticket comprises: means for verifying whether the redeem condition recorded in a redeem condition definition part of the electronic ticket defined by the abovesaid electronic ticket definition scheme is satisfied or not; means for recording a redeem certificate in a redeem certificate recording part when the redeem condition is met; means for recording a redeem condition satisfaction certificate in a redeem condition satisfaction certificate recording part; and means for sending the electronic ticket to a service provider.

A punching apparatus for the above electronic ticket comprises: means for verifying whether the redeem condition recorded in the condition recording part is satisfied; and means for recording the storing electronic ticket when the redeem condition is satisfied.

BRIEF DESCRIPTION OF THE DRAWINGS

FIG. 2A is a diagram depicting the data structure of a ticket that is circulated among issuer, user and service provider equipment depicted in FIG. 1;

FIG. 2B is a diagram depicting the data structure of a ticket schema that defines the ticket data structure;

FIG. 3A is a diagram depicting an example of the definition of an issue condition;

FIG. 3B is a diagram depicting an example of the definition of a transfer condition;

FIG. 3C is a diagram depicting an example of the definition of a redeem condition;

FIG. 3D is a diagram depicting a schema definer table that specifies a schema definer which is allowed to provide a schema definition for each type of right;

FIG. 3E is a signed table of schema IDs' corresponding to respective types of rights;

FIG. 4 is a diagram showing an example of a lottery ticket issuer certificate;

FIG. 5 is a diagram showing an example of a lottery ticket issuer certificate schema;

FIG. 6 is a diagram showing an example of a user certificate;

FIG. 7 is a diagram showing an example of a user certificate schema;

FIG. 8 is a diagram showing an example of a redeem certificate;

FIG. 9 is a diagram showing an example of a redeem certificate schema;

FIG. 10 is a diagram showing an example of a transfer certificate;

FIG. 11 is a diagram showing an example of a transfer certificate schema;

FIG. 12 is a diagram showing an example of the definition of a lottery ticket;

FIG. 13 is a diagram showing an example of the definition of a lottery ticket schema;

DETAILED DESCRIPTION OF THE PREFERRED EMBODIMENTS

The issuance, transference and redemption (consumption or examination) of such various tickets as mentioned previously can be considered as the circulation of rights guaranteed by or written on the tickets. The circulation of rights consists of these three principal transactions of issuance, transference and redemption. That is, the electronic ticket is created by an issuer and sent (issued) to a user directly or over a network. In this instance, the user may be a consumer, shop, or enterprise. The electronic ticket thus issued is circulated (transferred) from one user to another, and finally, it is consumed (punched) in exchange for services by a service provider. According to the type of ticket, the number of times it can be used is reduced, or the ownership of the ticket is voided.

Parameters that can be used to control the circulation of diverse tickets are, for example, the number of times they can be used, the term of validity, duplicability, transferability and the scope of circulation. The scope of circulation is limited by qualification conditions required of the ticket sender and of the ticket receiver. For example, when a tour agent recruits members of a touring club and issues specific travel coupons (tickets) to them, the ticket sender is required to possess a business license and the ticket receiver is required to have a membership certificate indicating that he or she is a member of the touring club. The business license of the tour agent can be regarded as the right that the agent has, and the membership certificate as the right that the member possesses. That is, the circulation of tickets can be considered to be transfer of rights among such rights owners.

From this point of view, the present invention controls the ticket circulation by describing the sender conditions and the receiver conditions on the ticket itself for each of the ticket issue, transfer and redeem transactions. The present invention permits secure processing of various types of tickets following a common procedure by handling membership certificates and business licenses themselves as rights that can be circulated in electronic ticket form according to the present invention.

A detailed description will be given, with reference to the accompanying drawings, of embodiments of the present invention.

Figure 1:
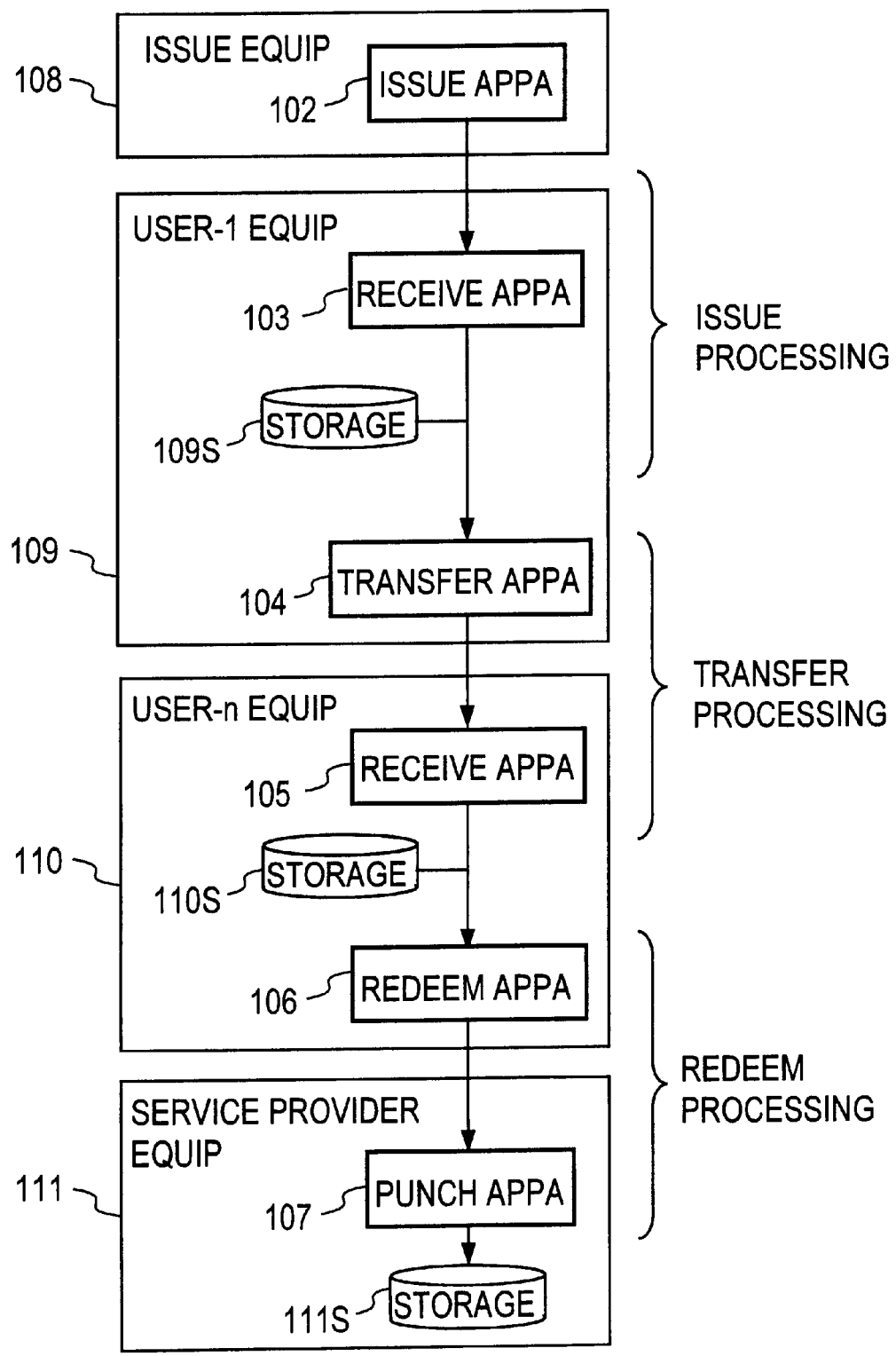
FIG. 1 is a block diagram illustrating the entire system for ticket issue, transfer and redeem transactions according to an embodiment of the present invention.

FIG. 1 illustrates in block form the entire system in which devices for issuance, transference and redemption of an electronic ticket (hereinafter referred to simply as a ticket) are connected in a sequential order according to an embodiment of the present invention.

As depicted in FIG. 1, a ticket is issued by an issuing apparatus 102 of issuer equipment 108 and is received by a receiving apparatus 103 of user equipment 109. In this move of the electronic ticket, the issuing apparatus 102 verifies whether the user-1 equipment 109 is appropriate, and if so, sends the ticket to the receiving apparatus 103 of the user-1 equipment 109. The receiving apparatus 103 verifies whether the received ticket is valid, and if so, stores the ticket in a storage device 109S. Also in the case where the ticket is transferred from the user-1 equipment 109 to user-n equipment 110, a transferring apparatus 104 verifies whether the user-n equipment 110 is appropriate, and if so, sends the ticket to a receiving apparatus 105. The receiving apparatus 105 of the user-n equipment 110 verifies whether the received ticket is valid, and if so, stores it in a storage device 110S.

In the case of redeeming the electronic ticket by a redeeming apparatus 106 of the user-n equipment 110 and punching it by a punching apparatus 107 of service provider equipment 111, the redeeming apparatus 106 similarly verifies whether the service provider equipment 111 is appropriate, and if so, sends the ticket to the punching apparatus 107 of the service provider equipment 111. The punching apparatus 107 verifies whether the received ticket is valid, and if so, stores it in a storage device 111S. Incidentally, there is a case where such a move (transfer) of the electronic ticket does not occur, or the move may sometimes be repeated between the user units a plurality of times as required.

FIG. 2A shows the data structure of a ticket 230 which is circulated among the issuer, user and the service provider equipment depicted in FIG. 1, and FIG. 2B shows the data structure of a ticket schema 210 which defines the ticket structure.

A brief description will be given first of features of the electronic ticket according to the present invention. The electronic ticket 230 depicted in FIG. 2A comprises: an issuer ID 237 indicating the issuer of the ticket; rights information (types of rights, term of validity, and so on) 239 of the ticket; issue conditions 240; transfer conditions 241; and redeem conditions 242. The issue conditions 240, the transfer conditions 241 and the redeem conditions 242 define requirements (qualification) for the ticker sender and requirements (qualification) for the ticket receiver in the issuance, transfer and redemption phases, respectively. With such a ticket format, diverse tickets can be encoded as electronic tickets capable of general-purpose circulation. In the embodiments of FIGS. 2A and 2B, the ticket format of FIG. 2A is defined by the schema 210 of FIG. 2B which is specified by a schema ID 231, and the ticket is structured following the format. Such a ticket schema is prepared for each type of rights of the ticket and is made public, for example, by a server on a network, allowing anyone to freely access the ticket schema. Alternatively, a table of schemes corresponding to respective types of rights may be pre-distributed to users.

An embodiment of the present invention will be concretely described below.

As depicted in FIG. 2A, the ticket 230 comprises a schema ID 231, a ticket ID 232, a ticket instance 233, an owner ID 234, an issuer signature 235, and a circulation certificate 236.

The schema ID 231 is an identifier of the ticket schema 210 (FIG. 2B) that specifies the structure of the ticket 230 and the properies that the ticket is to possess. The ticket schema 210 will be described in detail later on.

The ticket ID 232 is an identifier of the ticket 230, and is so chosen as to be unique among all tickets.

The ticket instance 233 comprises an issuer ID 237, a right type 238, rights information 239, an issue condition 240, a transfer condition 241 and a redeem condition 242. The issuer ID 237 is an identifier of a person or organization who issues tickets. The right type 238 is an identifier indicating the ticket type such as a plane ticket, gift certificate, lottery ticket, or event ticket. The rights information 239 defines ticket-dependent detailed rights information, e.g., in the case of a plane ticket, the date of departure, the flight number, etc., and in the case of an event ticket, the time and place of the event, etc. The issue, transfer and redeem conditions 240, 241 and 242 will be described later on.

The owner ID 234 is an identifier of a person or organization who owns the ticket. The issuer signature 235 is a signature of the issuer attached to the entire block of information consisting of the schema ID 231, the ticket ID 232, the ticket instance 233 and the owner ID 234. Signature schemes that can be used in this case are electronic signature schemes such, for example, as the RSA scheme by RSA Data Security Inc. and ESIGN by Nippon Telegraph and Telephone Corporation. More specifically, the issuer creates secret and public keys of public key cryptography, then generates the signature 235 for the information 231 to 234 using the secret key, and distributes the public key and its certificate, for example, as attachments to the ticket 230 (though not shown). In case the public key used as the issuer ID 237 and described in the electronic ticket 230, there is no need of distributing the public key and its certificate as attachments to the electronic ticket 230.

The circulation certificate 236 will be described later in detail.

Figure 14:
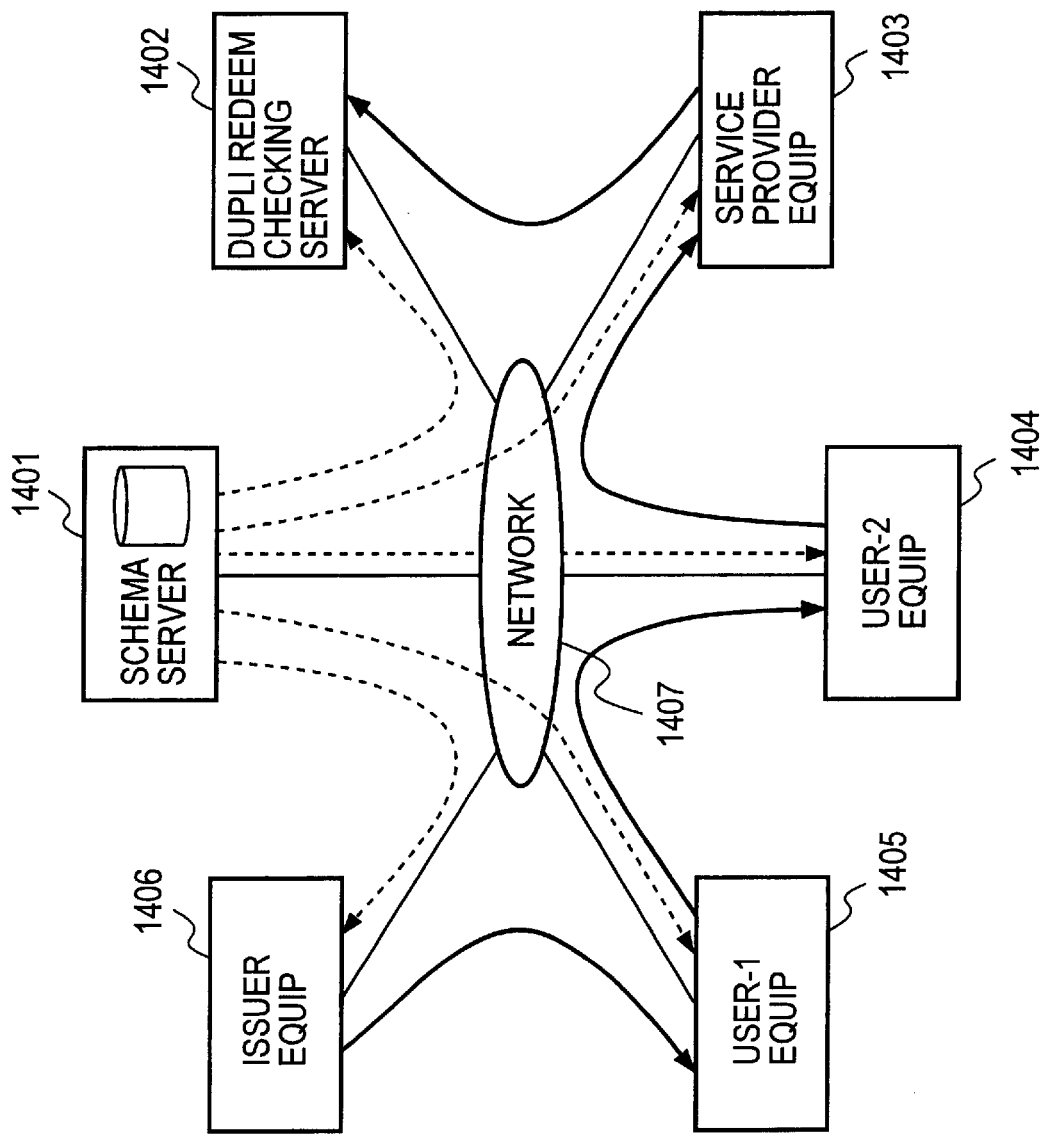
FIG. 14 is a diagram illustrating an example of a ticket circulation system in which issuer equipment, user equipment, service provider equipment, schema definer equipment and the duplicate redemption checking equipment, which are constituents of the present invention, are interconnected on a network.
Figure 15:
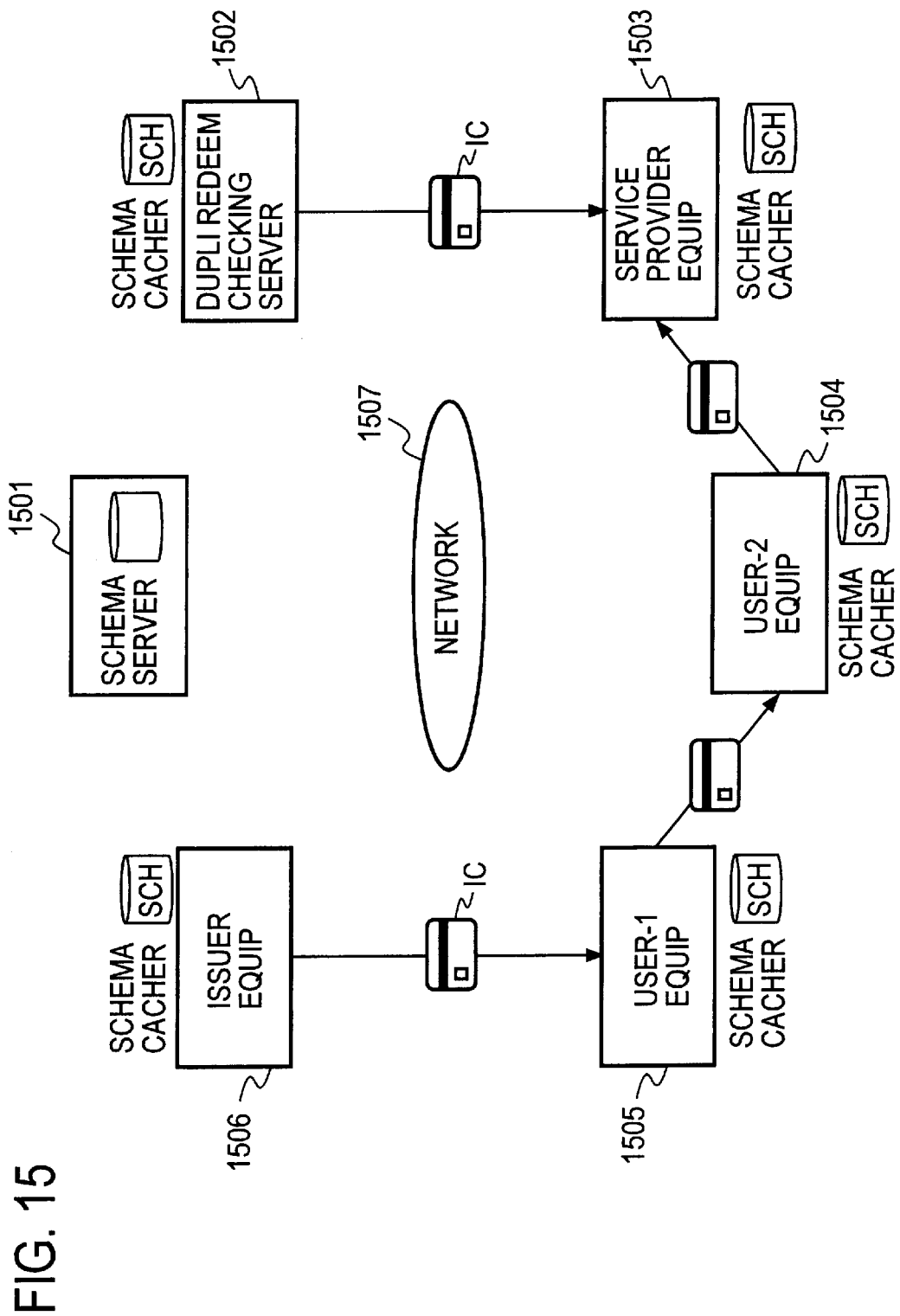
FIG. 15 is a diagram illustrating an example of a ticket circulation system in which issuer equipment, user equipment, service provider equipment, schema definer equipment and the duplicate redemption checking equipment, which are constituents of the present invention, are not interconnected on a network.

The ticket schema 210 is information that specifies the structure of the ticket 230 and the kinds of properties required of the ticket 230, and it can freely be defined by a schema definer such as an issuer, service provider, or industry trade group. As depicted in FIG. 14, provision is made to allow free access to the ticket schema 210 over a network 1407 through the use of a schema server 1401 or the like. As shown in FIG. 15, however, the ticket schema 210 may also be pre-distributed to issuer equipment 1506, user equipment 1505 and 1504, service provider equipment 1503, etc. In this instance, there is no need of connecting the schema server to the network 1507 at all times. Accordingly, ticket transactions can also be processed offline when using a smart card or the like.

The ticket schema 210 comprises, as depicted in FIG. 2B, a metaschema ID 211, a schema definer ID 212, a schema ID 213, a ticket skeleton 214, and a schema definer signature 215. The schema definer signature 215 is generated in the same manner as that for the ticket issuer signature. The schema definer creates secret and public keys, then generates the signature 215 for the information 211 to 214 using the secret key, and distributes the public key and the public key certificate, for example, as attachments to the schema (though not shown). In case the public key used as the schema ID 213 and described in the ticket schema 210, there is no need of distributing the public key and its certificate as attachments to the ticket schema 210.

The metaschema ID 211 is an identifier for the structure of the ticket schema. When the ticket schema structure is changed in the future, the metaschema ID 211 makes it possible to distinguish between old and new ticket schemata, facilitating a transition to the new schema. The schema definer ID 212 is an identifier of a person or organization which defines the ticket schema.

The schema ID 213 is an identifier of the schema 210 itself. Where the ticket schema 210 with the schema ID 213 is signed by the schema definer, it is possible to verify that the ticket schema 210 is valid for the schema ID 213 even if the ticket schema 210 is cached on a local storage medium (a schema cache SCH) as depicted in FIG. 15 or even if it is received directly from the other party of a transaction. The ticket schema 210 needs to be made public using, for example, the schema server 1401 in FIG. 14 as previously mentioned. This can be done, for example, by a method which specifies the schema ID by the Universal Resource Identifier (URI) specified in the World wide Web Consortium (W3C) and obtains the ticket schema placed on the network using HTTP protocol specified in IETF.

The ticket skeleton 214 comprises, as is the case with the ticket instance 233, an issuer ID 216, a right type 217, a rights information structure definition 218, an issue condition 219, a transfer condition 220, and a redeem condition 221. The issuer ID 216 is an identifier of a person or organization which issues the ticket, as is the case with the ticket issuer ID 237. However, the value of this identifier need not always be specified unlike in the case of the ticket issuer ID 237. The right type 217 defines the same value as that in the right type 238 of the ticket 230. The rights information structure definition 218 defines the kinds of ticket-dependent detailed properties to be defined by the rights information 239 of the ticket 230, e.g., in the case of a plane ticket, the departure date, the flight number, etc., and in the case of an event ticket, the time and place of the event, etc. The rights information structure definition 218 may also specify concrete values of such properties. In this instance, only the concrete property values can be defined on the ticket specified by this ticket schema.

The issue condition 219 consists of a set of conditions to be met by the ticket issuer and a set of conditions to be met by the ticket receiver. One of the issue conditions for the ticket issuer is that only a qualified agent (holding a business license) can issue tickets (as in the cases of lottery tickets and betting tickets). One of the conditions for the ticket receiver is that a ticket is issued only to a qualified person (for example, in the case of a student discount transportation ticket, a student having a student identification card). To define such issue conditions, the present invention uses a ticket schema ID(s) required of the sender (hereinafter referred to simply as a sender's ticket schema ID) 251 and a ticket schema ID(s) required of the receiver (hereinafter referred to simply as a receiver's ticket schema ID) 252 as shown in FIG. 3A. The sender's ticket schema ID 251 corresponds, for example, to a schema identifier of the lottery ticket issuing license in the above example. The receiver's ticket schema ID 252 corresponds, for example, to a schema ID of the student identification card in the above example.

The transfer condition 220 consists of a transferability condition and, when transferable, conditions required of the ticket transferor and conditions required of the ticket transferee. For example, one of the conditions for the ticket transferor is that, as in the case of a plane ticket only qualified user (a travel agent holding a business license) is allowed to transfer or sell tickets. One of the conditions for the ticket transferee is that a ticket is transferred only to a qualified person (for example, in the case of a student discount transportation ticket, a student having a student identification card). To define such transferability conditions, the present invention uses a transferability condition 261, a ticket schema ID(s) required of the sender (hereinafter referred to simply as a sender's ticket schema ID) 262, and a ticket schema ID(s) required of the receiver (hereinafter referred to simply as a receiver's ticket schema ID) 263 as depicted in FIG. 3B. The sender's ticket schema ID 262 corresponds, for example, to a schema identifier of the travel agent's business license in the above example. The receiver's ticket schema ID 263 corresponds, for example, to a schema identifier of the student identification card in the above example.

The redeem condition 221 consists of conditions for the ticket itself, conditions required for a ticket redeemer, and conditions required for ticket puncher. In the present invention, the conditions for the ticket itself are specified, as depicted in FIG. 3C, by an expiry date 271, a valid number of times 272 and orderliness 273 of the ticket. The expiry date 271 comprises the effective date of the ticket and its expiration date. The valid number of times 272 is to specify how many times the ticket can be used. Tickets which are specified by this condition are roughly divided into three types: tickets which can be used an unlimited number of times, such as a commutation ticket and a passport; tickets which are valid or effective until a specified number times or a specified number of counts are reached, such as a telephone card and a coupon ticket; and tickets which can be used only once, such as a train ticket and a concert ticket. The orderliness 273 is to specify the ticket owner's turn for receiving services. Tickets which are specified by this condition are those which are redeemed in a specified numeric order, such as order tickets used at banks and hospitals.

For example, one of the ticket redeemer conditions is that only a special member (holding a membership certificate) is allowed to redeem a member discount ticket. One of the ticket puncher condition is that only a qualified service provider (holding a punching certificate or license) is allowed to punch tickets. To define such redeem conditions, the present invention uses a ticket schema ID(s) required of the sender (hereinafter referred to simply as a sender's ticket schema ID) 274 and a ticket schema ID(s) required of the receiver (hereinafter referred to as a receiver's ticket schema ID) 275. The sender's ticket schema ID 274 corresponds, for example, a schema identifier of the membership certificate in the above example. The receiver's ticket schema ID 275 corresponds, for example, to a schema identifier of the punching license in the above example.

The issue, transfer and redeem conditions 219, 220 and 221 in FIG. 2B may each include, for example, conditions such as the scale and capital of the issuer and conditions such as the age and height of the ticket transferee in addition to the abovementioned possession of various certificates. Though not described in detail in the above, these conditions can be specified, for example, by specifying such particular properties and their values as mentioned above as well as by specifying the various certificates through the use of the ticket schema ID's as described above.

The issue, transfer and redeem conditions 240, 241 and 242 that are defined on the part of the ticket are identical in structure with the issue, transfer and redeem conditions 219, 220 and 221 that are defined on the part of the ticket schema described above. The contents of the issue, transfer and redeem conditions 219, 220 and 221 defined by the ticket schema 210 to which the ticket 230 refers to are also common to the contents of the issue, transfer and redeem conditions 240, 241 and 242 defined on the part of the ticket 230. However, when an additional definition is allowed on the part of the ticket schema 210, a different condition can be added on the part of the ticket 230. By this, for example, in the case where an administrative organ or industry trade group prescribes the ticket schema and each enterprise issues tickets defined by the ticket schema, the ticket circulation can be controlled under conditions harsher than the issue, transfer and redeem conditions defined by the ticket schema, and it is also possible to inhibit the circulation under easy conditions.

In this embodiment, the issue, transfer and redeem conditions 240, 241 and 242 that are defined on the part of the ticket may be omitted, in which case it is possible to derive the ticket schema 210 from the ticket schema ID 231 defined in the ticket 230, and to use, as the ticket circulation conditions, the issue, transfer and redeem conditions 219, 220 and 221 which are defined on the part of the ticket schema 210. In this instance, however, no condition can be additionally defined for each ticket.

In a ticket processing system which does not support the transfer of tickets, the transfer condition 260 (FIG. 3B) can be omitted. In a ticket processing system with a fixed issuer, the sender condition 251 of the issue condition 250 (FIG. 3A) need not be described in the ticket 230 itself if this information is held on the part of the ticket processing system. Similarly, in a ticket processing system with a fixed service provider, the receiver condition 275 of the redeem condition 270 (FIG. 3C) may be omitted.

In the case of a ticket processing system in which the user qualification condition is fixed, that is, when it is premised, for example, that the user of the ticket processing system is a member of a particular membership, the receiver's ticket schema ID 252 which is the receiver condition in the issue condition 250, the sender' ticket schema ID 262 which is the sender condition in the transfer condition 260, the receiver's ticket schema ID 263 which is the receiver condition in the transfer condition 260, and the sender's ticket schema ID 263 which is the sender condition in the redeem condition 270 need not be described on the ticket 230 itself if these pieces of information are held on the part of the ticket processing system.

In the case where the user qualification condition varies for each ticket but the receiver's ticket schema ID 252 of the issue condition 250 and the sender's ticket schema ID 262 and the receiver's ticket schema ID 263 of the transfer condition 260, and the sender's ticket schema ID 274 of the redeem condition 270 can be used as common conditions (user conditions), they can be defined as three kinds of conditions, i.e. issuer, user and service provider conditions, as substitutes for the issue, transfer and redeem conditions 250, 260 and 270. In this case, the contents specified by the issuer condition are used as the sender's ticket schema ID 251 of the issue condition 250, the contents specified by the user condition are used as the receiver's ticket schema ID 252 of the issue condition 250, the sender's and receiver's ticket schema ID's 262 and 263 of the transfer condition 260 and the sender's ticket schema ID 274 of the redeem condition 270, and the contents specified by the service provider are used as the receiver's ticket schema ID 275 of the redeem condition 270. By this, ticket processing can be done in the same manner as is possible with the embodiment described below in detail. With this scheme, however, it is impossible to effect control that permits the ticket transfer only to a particular user (a person holding a business license, for instance) but inhibits the ticket transfer to ordinary users. As described above, according to the precondition for the ticket processing system, not all the conditions need not be defined in the ticket or ticket schema.

The circulation certificate 236 is a part where to record ticket transactions during circulation as depicted in FIG. 2A, and it comprises: issue condition satisfaction certificates 243 for proving the satisfaction of the issue condition 240 in the phase of ticket issuance; transfer certificates 244 and 246 for proving the transferor and the transferee, respectively, and transfer condition satisfaction certificates 245 and 247 for proving the satisfaction of the transfer condition 241 in the phase of ticket transference; and a redeem certificate 248 for proving the redemption by the user and a redeem condition satisfaction certificate 249 for proving the satisfaction of the redeem condition 242 in the phase of ticket redemption. The issue condition satisfaction certificate 243, the transfer condition certificates 245 and 247, and the redeem condition satisfaction certificates 249 are, in concrete terms, tickets of a issue license, a student identification card, a business license, etc.

The circulation certificate 236, which records information about transactions during circulation, need not always be held in the ticket 230, but instead the users having engaged in the transactions record respective pieces of information as their logs and, upon detection of a duplicate redemption or similar fraud, present the logs to an investigative institution. Alternatively, these pieces of circulation information may also be recorded as a single unit in a server. In this case, the pieces of circulation information may also be recorded as a single unit in a server. Moreover, even the logs need not always be recorded either, in which case it is difficult to find out an offender even if double spending or fraud is detected afterward. In practice, however, this does not cause any problem in the case of handling inexpensive tickets or when programs of the electronic ticket processing system are stored in a tamper-proof unit and hence cannot easily be altered.

FIGS. 4 through 13 show concrete examples of the ticket and ticket schema described above. The following will describe in detail how to control the issue and redeem conditions in respect of the illustrated examples.

In FIGS. 4 to 13 slant lines indicate that no definitions are given of the properties concerned. And an asterisk in the ticket schema means that an arbitrary value can be specified in the item concerned.

Since values of public keys are available from public key certificates, it is possible to use, as the issuer ID's 216 and 237, the owner ID 234 and the schema definer ID 212, identifiers or hash values of the public key certificates or hash values of the public keys instead of using the public keys generated by the respective ID owners. In these instances, the public keys or the public key certificates need to be distributed. The public key certificates can also be specified in the sender's ticket schema ID and the receiver's ticket schema ID as tickets necessary for issue, transfer and redeem transactions, and provision can also be made to utilize the key information for signature verification. With a view to avoiding the distribution of the public key to simplify the processing involved, this embodiment utilizes, as the issuer ID's 216 and 237, the owner ID 234 and the schema definer ID 212, the public keys generated by the respective ID owners.

FIG. 12 depicts an example of the definition of a lottery ticket. The layouts of the properties 1201 to 1205 and 1217 to 1219 are the same as shown in FIGS. 2A, 3A, 3B and 3C, and values of the properties of the lottery ticket are shown. No description will be given of the individual property values. And the structure of the lottery ticket schema depicted in FIG. 13 is also the same as depicted in FIG. 2B. Not everybody can freely issue lottery tickets; it is necessary that only a qualified issuer be officially allowed to issue them. According to the present invention, a table 300 which specifies identifiers of schema definers allowed to issue schema definitions of right types 301, 302 and 303, depicted in FIG. 3D, is made open to the public. To prevent its alterations, the table 300 is signed with a secret key or the like that the ticket processing system possesses. With this method, it is possible to detect that a ticket, though belonging to one of the right types appearing in the table 300, is invalid if the ticket schema referred to by the ticket has been defined by a body or enterprise not appearing in the table 300.

Alternatively, a schema ID table 310 which defines ticket schema identifiers for right types 311, 312 and 313 as shown in FIG. 3E is made open to the public. With this method, too, it is possible to detect that a ticket, though belonging to one of the right types appearing in the table 310, is invalid if the ticket schema identifiers referred to by the ticket is not appearing in the table 310. In this instance, it is necessary to guarantee or ensure the uniqueness of the relationship between the ticket schema identifier and the ticket schema, and this requirement can be met, for example, by using the hash value of the ticket schema as the schema identifier. In the case of this embodiment, too, a signature 314 is attached to the schema ID table, for example, using the secret key held by the ticket processing system so as to prevent alterations in the table 310.

In this embodiment, the schema definer table 300 or the schema ID table 310 are made public by distributing it with the HTTP protocol through the use of the schema server 1401 (FIG. 14) connected to a network. Of course, the table can be distributed as an e-mail, or by a satellite broadcasting, or using a commercially available CD-ROM, and various other methods can be used. In the case of employing delivery means free from the possibilities of alterations, the signature 304 to the schema definer table 300 and the signature 314 to the schema ID table 310 can be dispensed with.

For instance, when "lottery ticket" is defined as a right type 1305 in a ticket schema 1300 of the lottery ticket depicted in FIG. 13, a list of schema definers corresponding to the right type can be obtained using the table of FIG. 3D. If the schema definer ID 1302 in FIG. 13 is contained in the list, the ticket schema can be determined as a valid ticket schema.

In the ticket schema 1300 of the lottery ticket depicted in FIG. 13, a schema ID 503 of a lottery issuer certificate 500 shown in FIG. 5 is specified as a ticket schema ID required of the sender (hereinafter referred to simply as a sender's ticket schema ID) 1307 of the issue condition, and a schema ID 703 of a user registration certificate schema 700 depicted in FIG. 7 is specified as a ticket schema ID required of the receiver (hereinafter referred to simply as a receiver's ticket schema ID) 1308. By this, it is defined that the lottery ticket issuer needs to have a lottery issuer certificate 400 (FIG. 4) and that the lottery ticket receiver needs to have a user registration certificate 600 (FIG. 6). Similarly, it is defined that the redeemer specified in a ticket schema ID required of the sender (hereinafter referred to simply as a sender's ticket schema ID) 1316 of the redeem condition is required to have the user registration 600 shown in FIG. 6 and that an exchange office specified in a ticket schema ID required of the receiver (hereinafter referred to simply as a receiver's ticket schema ID) 1317 is required to have an exchange office certificate (not shown). As regards transference, the lottery ticket schema 1300 specifies a transferability property 1309 as unallowable, inhibiting the ticket transfer. No description will be given of the exchange office certificate.

FIG. 4 depicts an example of the lottery ticket issuer certificate 400, which is an instance of the lottery ticket issuer certificate schema 500 shown in FIG. 5. FIG. 6 shows an example of the user registration certificate 600, which is an instance of the user registration certificate schema 700 depicted in FIG. 7. In the cases of these tickets, certificates are not specified which are required for the issue, transfer and redeem transactions, but issuer ID's 504 and 704 specified in the ticket skeletons of the ticket schemata 500 and 700 are specified as issuer ID's 403 and 603, making it impossible for any other issuers to issue such certificates.

FIG. 14 is a conceptual diagram of a system in which the electronic tickets according to the present invention move across a network. Connected to the network 1407 are the schema server 1401, issuer equipment 1406, user-1 equipment 1405, user-2 equipment 1404, service provider equipment 1403 and a duplicate redemption checking server 1402. The issuer equipment 1406 creates a desired electronic ticket using a schema corresponding its right type and the schema identifier which are obtained from the schema server 1401, and sends the electronic ticket to the user-1 equipment 1405 over the network 1407. In the illustrated example, the user 1 transfers the ticket to the user 2, who sends the ticket to the service provider equipment 1403 to receive services described in the ticket.

In each phase of the move of the electronic ticket, the ticket sender verifies the conditions for both of the sender and the receiver by the schemata obtained from the schema server 1401 through the use of the sender's ticket schema ID and the receiver's ticket schema ID. At the time of verifying the received ticket, the ticket receiver derives a ticket schema from the schema server 1401 through the use of the ticket schema identifier, then verifies the consistency of the schema, and verifies whether the schema obtained from the schema server 1401 meets a particular condition, using the sender's ticket schema ID and the receiver's ticket schema ID in the issue, transfer, or redeem condition according to the phase of the ticket move.

The electronic ticket sent to the service provider 1403 is ultimately sent to the duplicate redemption checking server 1402 to check it for a fraud.

FIG. 15 illustrates a system in which the electronic ticket does not circulate over a network 1507 but instead, for example, a smart card (or some other recording medium) with the electronic ticket written thereon circulates from an issuer 1506 to user-1 equipment 1505, or from the user-1 equipment 1505 to user-2 equipment 1504, or from the user-2 equipment 1504 to service provider equipment 1503.

In this example, a table of schema identifiers and schemata and a table of right types and schema identifiers are pre-distributed to and prestored in schema catches SCH of the equipment 1502 through 1506 from a schema server 1501. Accordingly, the schema which is necessary for the verification in each phase of the ticket circulation is available from the schema cache SCH. The processing in each phase of the ticket circulation is the same as in the case of FIG. 14. In FIG. 15 the electronic ticket may also circulate across the network 1507 in one or more phases of its move as in the case of FIG. 14.

Figure 16:
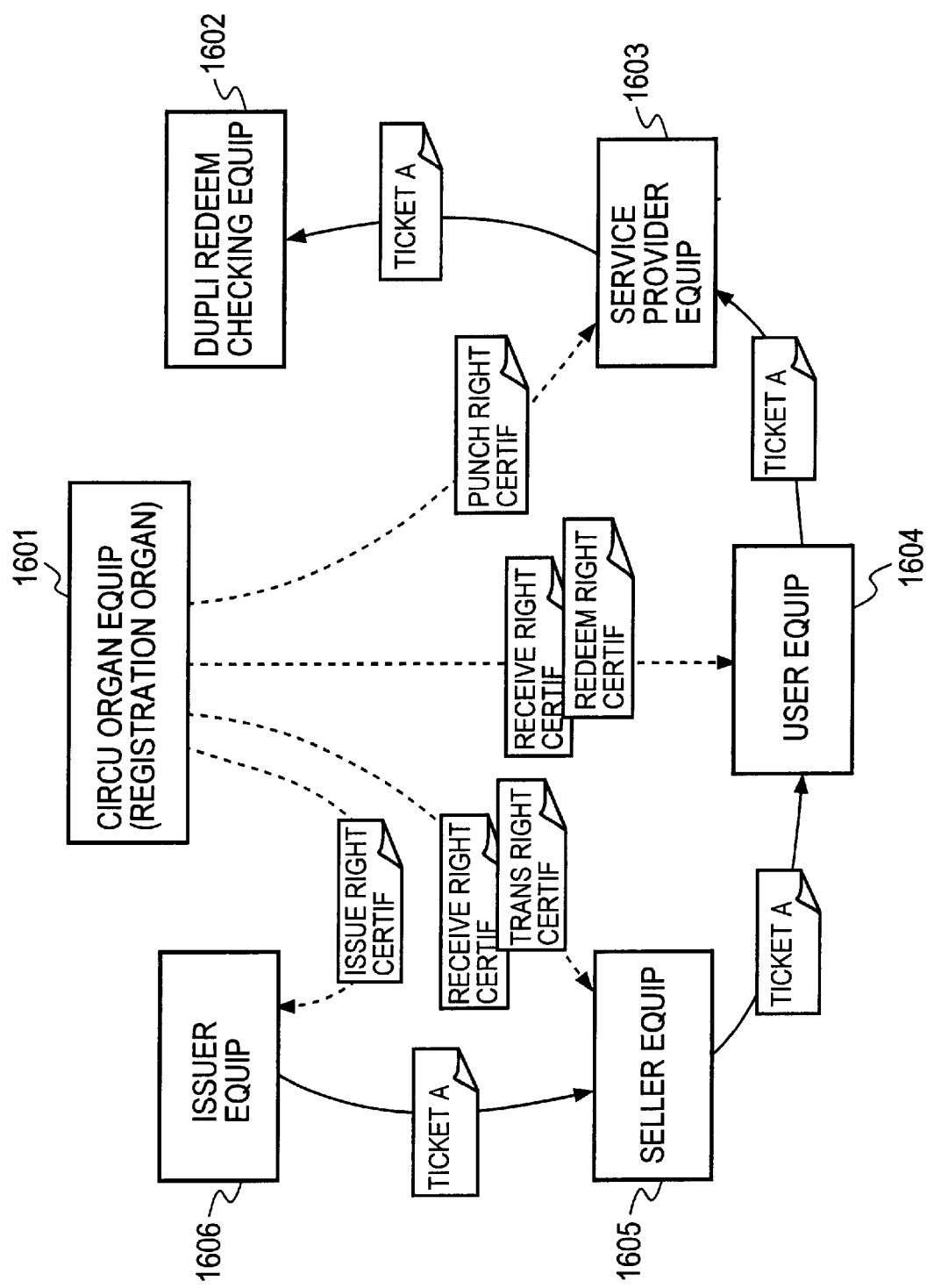
FIG. 16 is a block diagram depicting a ticket flow under circulation control.

FIG. 16 is a block diagram depicting the ticket flow placed under the circulation control described above. As depicted in FIG. 16, let institution equipment for controlling the circulation of some ticket be called circulation organizer equipment 1601 like an administrative institution for the lottery ticket. The circulation organizer equipment 1601 pre-distributes, as tickets for ticket circulation control, an issuing right certificate, a receiving right certificate, a transferring right certificate, redeeming right certificate and a punching right certificate to issuer equipment 1606, seller equipment 1605, user equipment 1604 and service provider equipment 1603, and which right certificate is to be referred to during circulation is defined in the target ticket and its schema. This enables to implement highly flexible circulation control. Moreover, since the abovementioned circulation control tickets of the issuing right certificate and so forth can be circulated by themselves using general-purpose ticket issuing, transferring and redeeming apparatuses described below, the operation of the predistribution of the circulation control tickets and so forth can also be performed uniformly. As depicted in FIGS. 4, 6, 8 and 10, the certificate, the registration certificate and the license all have the same format as do the tickets; therefore, they can also be circulated using the general-purpose devices.

The issuing right certificate and the transferring right certificate are also tickets, and circulation conditions for controlling their circulation can also be specified.

Next, a description will be given, with reference to the drawings, of the procedures of the issuing, receiving, transferring, redeeming and punching apparatuses that are constituents of the present invention.

Figure 17:
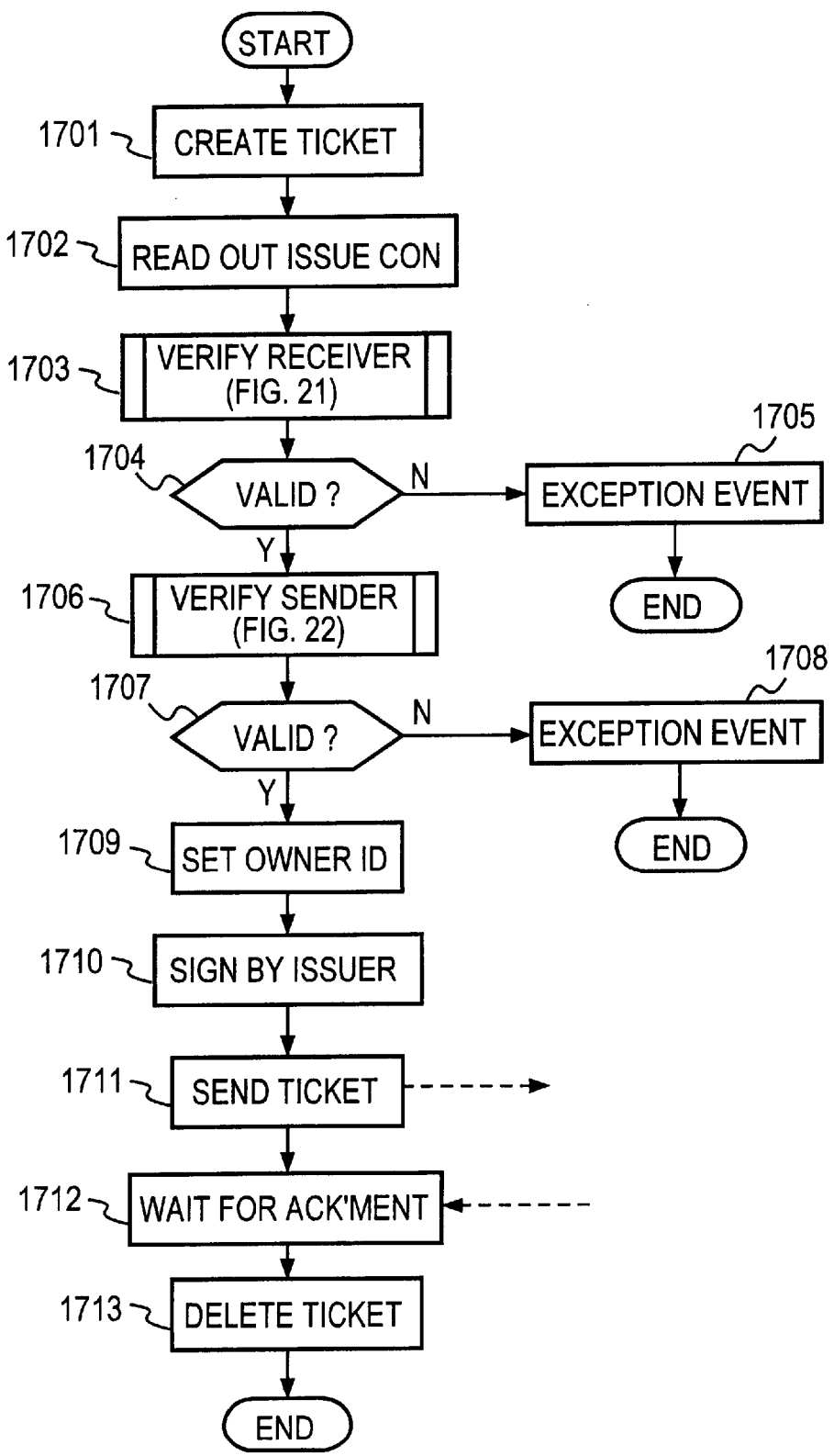
FIG. 17 is a flowchart depicting a main procedure of a ticket issuing apparatus.

FIG. 17 shows a main procedure by which the issuing apparatus 102 of the issuer equipment 108 (FIG. 1) generates and sends a ticket.

Step 1701: Create the ticket instance 233 using, as a template therefor, the ticket schema 210 (FIG. 2B) of the object to be issued. Then, set in the ticket 230 (FIG. 2A) the ticket ID 232 and values of properties which are not defined in the ticket schema based on information such as a request from a user.

Step 1702: Read out the ticket issue condition 240 from the ticket instance 233.

Step 1703: Perform a receiver verification procedure using the issue condition 240 as the input therefor. The receiver verification (a verification of the condition to be met by the receiver) procedure will be described in detail with reference to FIG. 21.

Step 1704: If the receiver is found valid, go to step 1706, and if not valid, go to step 1705.

Step 1705: Generate an exception event and terminate the procedure.

Step 1706: Perform a sender verification procedure using the issue condition 240 as the input therefor. The sender verification (a verification of the condition to be met by the sender) procedure will be described in detail with reference to FIG. 22.

Step 1707: If the sender is found valid, go to step 1709, and if not valid, go to step 1708.

Step 1708: Generate an exception event and terminate the procedure.

Step 1709: Attach the issue condition satisfaction certificate 243 (FIG. 2A) to the ticket 230. The issue condition satisfaction certificate 243 is, for example, the issuer certificate 400 depicted in FIG. 4. Set the owner ID 234 in the ticket 230.

Step 1710: Create and attach the issuer's signature 235 to the ticket 230.

Step 1711: Send the ticket 230.

Step 1712: Wait for acknowledgment of receipt.

Step 1713: Delete the ticket 230 on receipt of acknowledgment.

Figure 18:
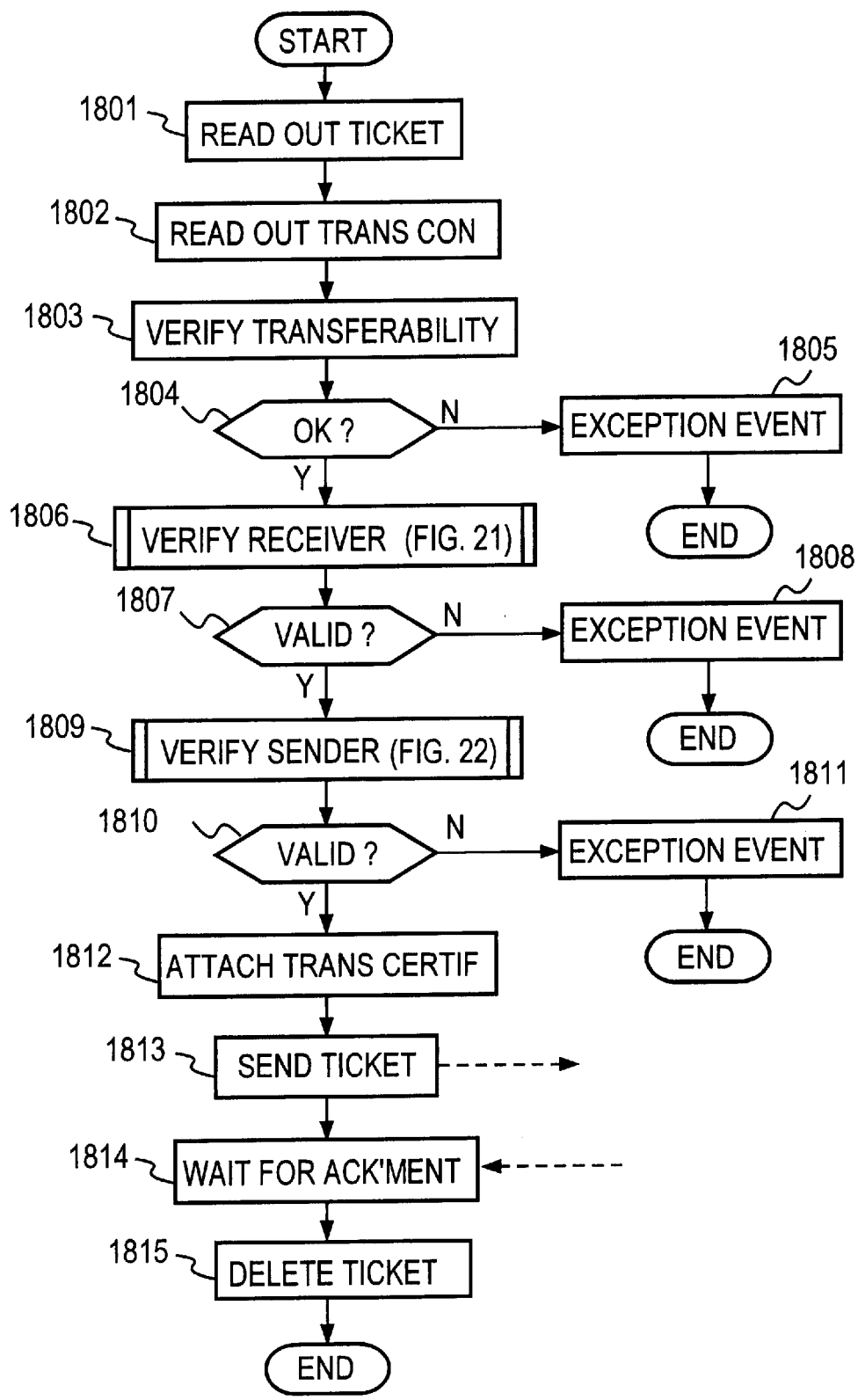
FIG. 18 is a flowchart depicting a main procedure of a ticket transferring apparatus.

FIG. 18 is a flowchart depicting a main procedure for the transfer of an electronic ticket by the transferring apparatus 104 of the user-1 equipment 109 (FIG. 1).

Step 1801: Read out of a recording medium the ticket to be transferred.

Step 1802: Read out the transfer condition 241 of the ticket 230.

Step 1803: Verify the transferability 261 (FIG. 3B).

Step 1804: If transferable, go to step 1806, and if not, go to step 1805.

Step 1805: Generate an exception event and terminate the procedure.

Step 1806: Perform the receiver verification procedure using the transfer condition 241 as the input therefor. The receiver verification procedure will be described in detail with reference to FIG. 21.

Step 1807: If the receiver is found valid, go to step 1809, and if not valid, go to step 1808.

Step 1808: Generate an exception event and terminate the procedure.

Step 1809: perform the sender verification procedure. The sender verification procedure will be described in detail with reference to FIG. 22.

Step 1810: If the sender is found valid, go to step 1812, and if no valid, go to step 1811.

Step 1811: Generate an exception event and terminate the procedure.

Step 1812: Create and attach a transfer certificate to the ticket.

FIG. 10 illustrates an example of the transfer certificate denoted by 1000. FIG. 11 shows a ticket schema 1100 of the transfer certificate 1000. The ticket schema 1100 of the transfer certificate 1000 is defined by a provider system of the transferring apparatus according to the present invention, and is given a special schema identifier (1103). And the transfer condition satisfaction certificate 245 is attached to the ticket by the sender verification procedure 1809, and this constitutes the user registration certificate 600 of FIG. 6.

The generation of a signature 1018 of the transfer certificate 1000 (FIG. 10) requires an owner's secret key, and hence it proves the possession of the secret key that only the owner knows. This is the function that the present invention utilizes as the authenticate function. To protect the ticket against an attack of attaching thereto a transfer certificate prepared for a different purpose, the present invention sets in rights information 1005 of the transfer certificate 1000 the ticket ID which is a ticket-specific identifier and the date of transfer. Another method is to sign a random value generated on the part of the ticket receiver.

Step 1813: Send the ticket.

Step 1814: Wait for acknowledgment of receipt.

Step 1815: Delete the created ticket on receipt of acknowledgment.

Figure 19:
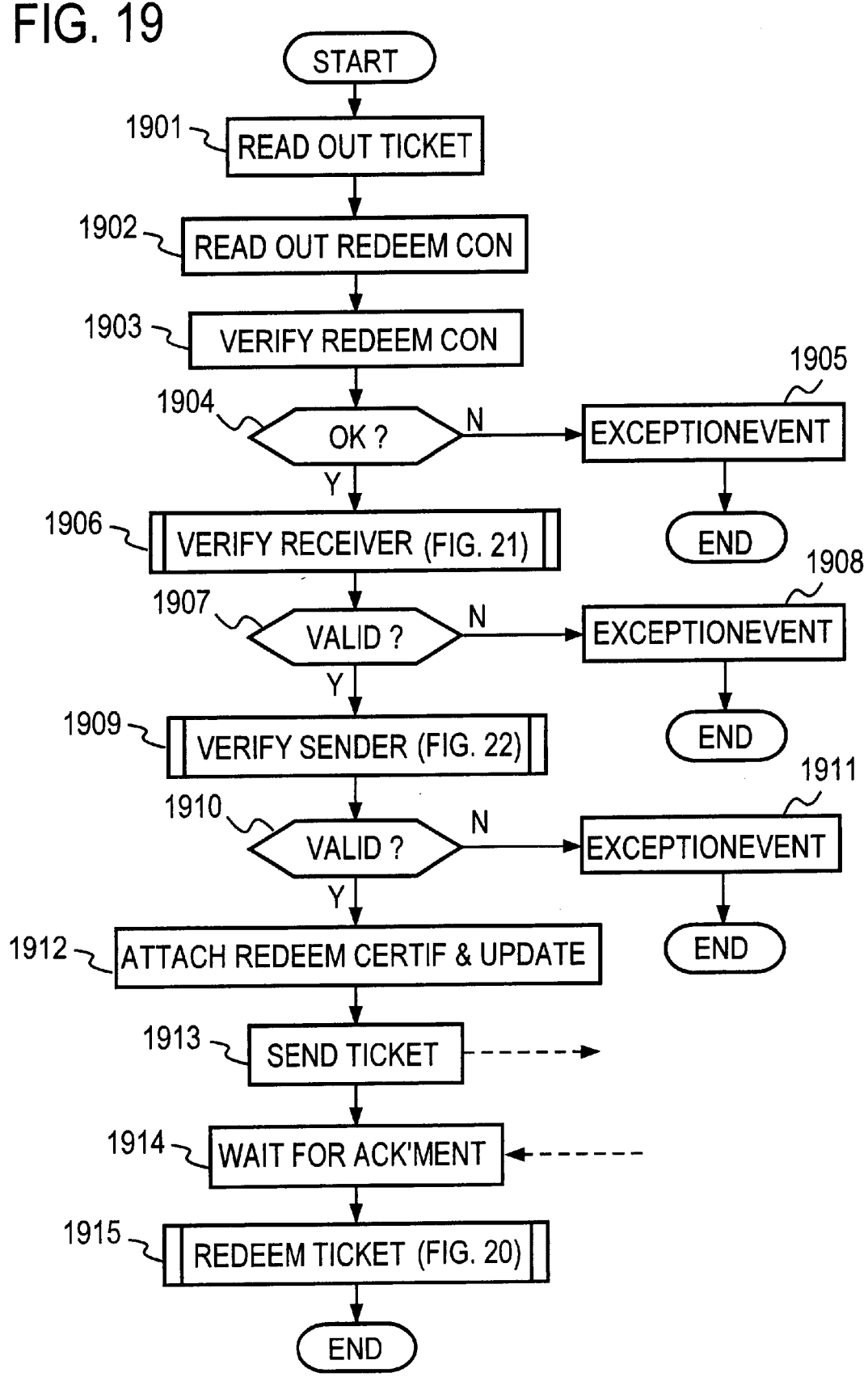
FIG. 19 is a flowchart of a main procedure of a ticket redeeming apparatus.

FIG. 19 is a flowchart depicting a main procedure for redeeming an electronic ticket by the redeeming apparatus 106 of the user-2 equipment 110 (FIG. 1).

Step 1901: Read out of a recording medium the ticket to be redeemed.

Step 1902: Read out the ticket redeem condition 242 (FIG. 2A).

Step 1903: Verify the expiration date, the valid number of times and the orderliness (FIG. 3C) to verify whether the ticket is redeemable.

Step 1904: If redeemable, go to step 1906, and if not, go to step 1905.

Step 1905: Generate an exception event and terminate the procedure.

Step 1906: Perform a receiver verification procedure using the redeem condition as the input therefor. The receiver verification procedure will be described in detail with reference to FIG. 21.

Step 1907: If the receiver is found valid, go to step 1909, and if not valid, go to step 1908.

Step 1908: Generate an exception event and terminate the procedure.

Step 1909: Perform a sender verification procedure using the redeem condition as the input therefor. The sender verification procedure will be described in detail with reference to FIG. 22.

Step 1910: the sender is found valid, go to step 1912, and if not valid, go to step 1911.

Step 1911: Generate an exception event and terminate the procedure.

Step 1912: Generate and attach the redeem certificate 248 to the ticket. In the case of a coupon ticket, since a redeem certificate would have already been generated if the ticket was used before, a new redeem certificate which indicates how many times the ticket can be used thereafter is generated and attached to the ticket.

Step 1913: Send the ticket.

Step 1914: Wait for acknowledgment of receipt.

Step 1915: On receiving the acknowledgment, perform a ticket redeem procedure using the redeem condition and the redeem certificate as the input therefor. The redeem procedure will be described in detail with reference to FIG. 20.

FIG. 8 shows, by way of example, the redeem certificate (hereinafter identified by 800) which is generated in step 1912. FIG. 9 shows a ticket schema 900 of the redeem certificate 800. The ticket schema 900 of the redeem certificate 800 is defined by a provider system of the redeeming apparatus according to the present invention, and is given a special schema ID (801, 903). The unlimited use of the ticket coupon without updating the remaining valid number of times can be prevented by utilizing a smart card or similar tamper-proof means whose contents cannot be changed by the user. It is also possible to utilize a duplicate redemption checking DB of the punching apparatus described later on.

The generation of a signature 818 of the redeem certificate 800 requires an owner's secret key, and hence it proves that the user knows the secret key that only the owner knows. This is the function that the present invention utilizes as the authenticate function. To protect the ticket against an attack of attaching thereto a transfer certificate prepared for a different purpose, the present invention sets in rights information 805 of the transfer certificate 800 the ticket ID which is a ticket-specific identifier and the date of redemption. Another available method is to sign a random value generated on the part of the ticket receiver.

Figure 20:
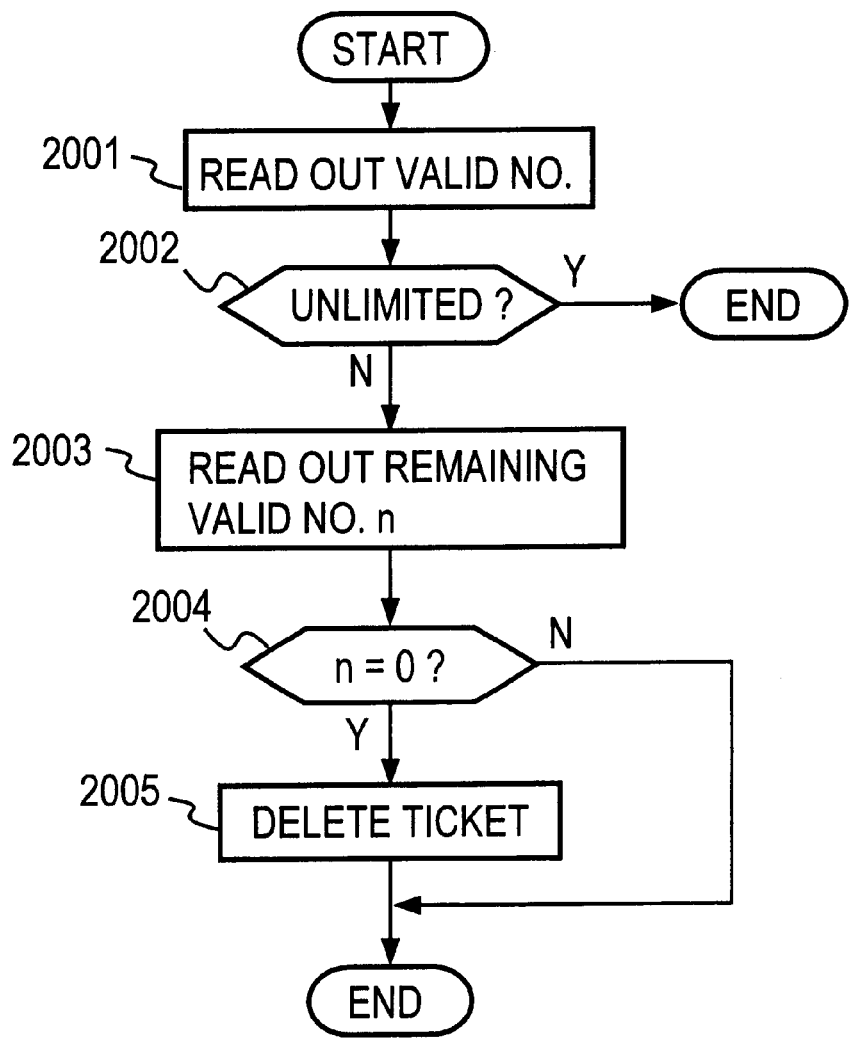
FIG. 20 is a flowchart depicting a ticket redeem procedure.

FIG. 20 is a flowchart of a ticket redeem procedure by the redeeming device 106 of the user unit 110.

Step 2001: Read out the valid number of times 272 (FIG. 3C) specified by the redeem condition 242 of the ticket 230 shown in FIG. 2A.

Step 2002: In the case of a ticket which can be used an unlimited number of times, such as a transportation pass or gate card, terminate the ticket redeem procedure. Otherwise, go to step 2003.

Step 2003: Read out the remaining valid number of times n (805) from the redeem certificate 248 (refer to, for example, the redeem certificate 800 depicted in FIG. 8, too).

Step 2004: In the case of a ticket which can be used only once, such as a concert ticket or train ticket, or in the case of a ticket which can be used only a specified number of times, such as a coupon ticket or prepaid card, make a check to see if the ticket can no longer be used, and if so, go to step 2005.

Step 2005: Delete the ticket and terminate the procedure.

Figure 21:
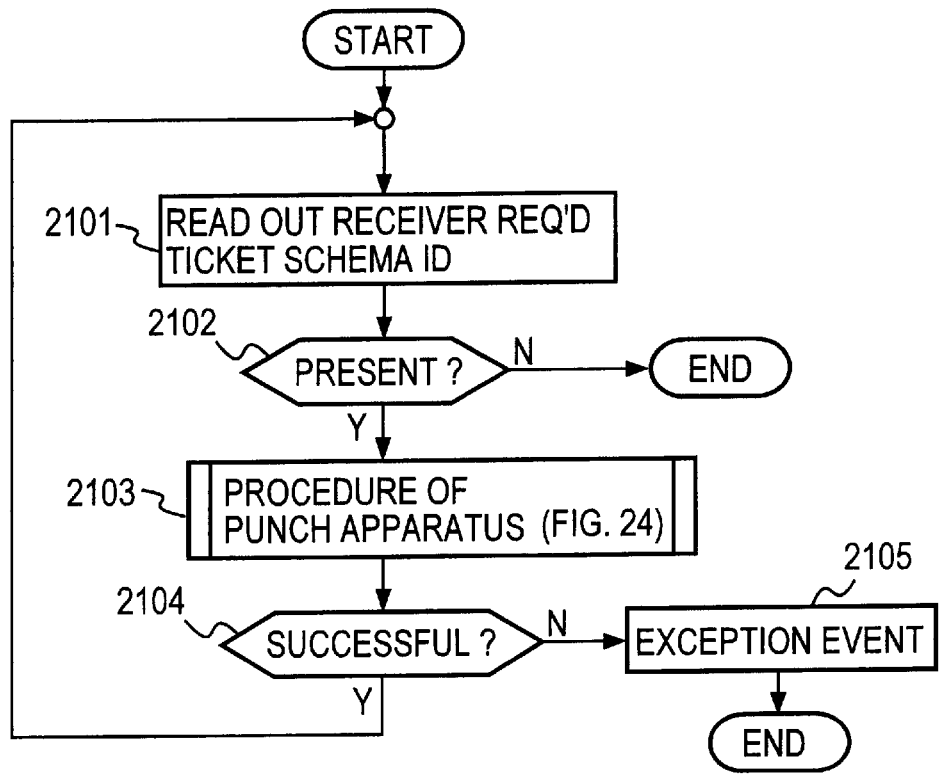
FIG. 21 is a flowchart depicting a receiver verification procedure.

FIG. 21 is a flowchart depicting the receiver verification procedure in each of step 1703 in FIG. 17, step 1806 in FIG. 18 and step 1906 in FIG. 19.

Step 2101: Read out an unverified one of the receiver request ticket schema ID's 252, 263 and 275 of the issue condition 250 (FIG. 3A), the transfer condition 260 (FIG. 3B) and the redeem condition 270 (FIG. 3C).

Step 2102: If no unverified receiver request ticket schema ID is present, terminate the procedure normally. If such a ticket schema ID is present, go to step 2103.

Step 2103: Perform a procedure of the punching apparatus depicted in FIG. 24 to make a check to see if the receiver has the ticket that is restricted by the receiver's ticket schema ID. It should be noted here that the main procedure of punching apparatus is in the direction opposite to that of the receiver verification procedure for each of the issue, transfer and redeem transactions. Hence, the receiver's ticket schema ID selected in step 2101 is provided as a punching ticket schema ID which is used as the input for the main procedure of the punching apparatus, and the sender ID in the receiver verification procedure is provided as the receiver ID which is used as the input for the main procedure of the punching apparatus.

Step 2104: If the punching procedure in step 2103 succeeds, return to 2101 for the next receiver verification (the receiver condition) using the receiver's ticket schema ID. If the punching procedure fails, go to step 2105.

Step 2105: Generate an exception event and terminate the procedure.

Figure 22:
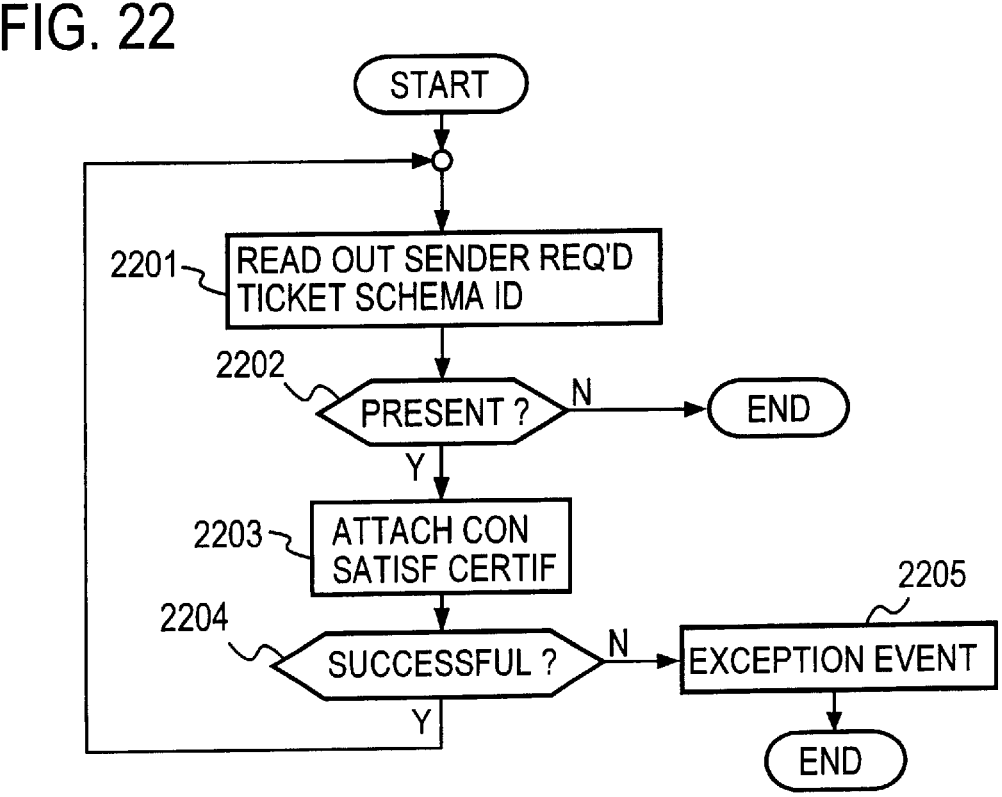
FIG. 22 is a flowchart depicting a sender verification procedure.

FIG. 22 is a flowchart of the sender verification procedure in each of step 1706 in FIG. 17, step 1809 in FIG. 18 and step 1909 in FIG. 19.

Step 2201: Read out an unverified one of the receiver request ticket schema ID's 251, 262 and 274 of the issue condition 250 (FIG. 3A), the transfer condition 260 (FIG. 3B) and the redeem condition 270 (FIG. 3C).

Step 2202: If no unverified receiver request ticket schema ID is present, terminate the procedure normally. If such a ticket schema ID is present, go to step 2203.

Step 2203: Retrieve from a recording medium the ticket specified by the sender's ticket schema ID, and attach to the ticket a certificate of satisfaction of the issue condition 240 (250) or the transfer condition 241 (260), or the redeem condition 242 (270), for example, an issuer certificate for the issue condition and a user registration certificate for the transfer and redeem conditions.

Step 2204: If the specified ticket could not be retrieved, go to step 2205. If the ticket could be retrieved, return to 2201 for the next sender verification (the sender condition) using the sender's ticket schema ID.

Step 2205: Since the sender condition is not met if the specified ticket could not be retrieved, generate an exception event and terminate the procedure.

Figure 23:
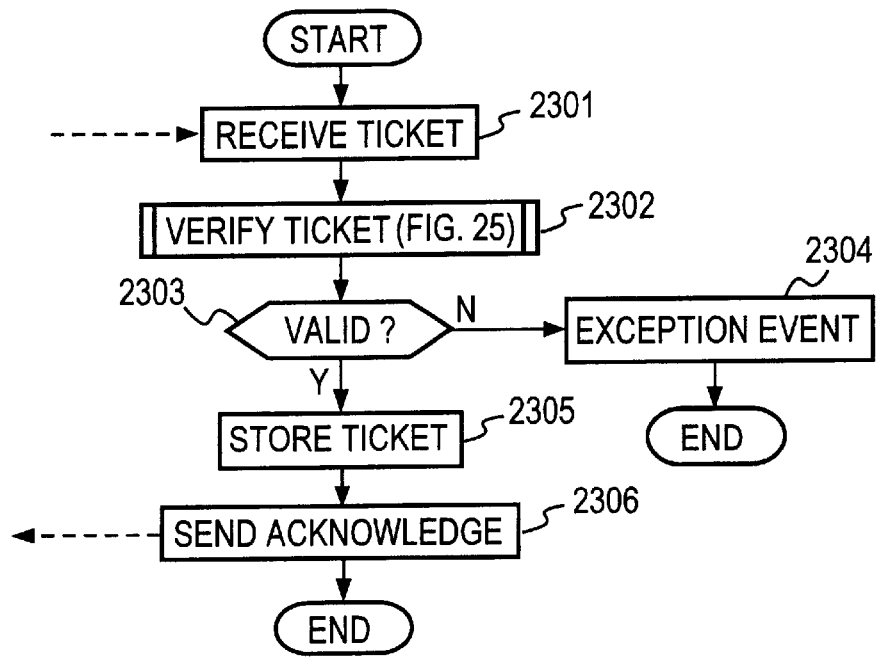
FIG. 23 is a flowchart depicting a main procedure of a receiving apparatus.

FIG. 23 is a flowchart of a ticket receiving procedure by the receiving apparatus 103 or 105 of the user equipment 109 or 110 (FIG. 1).

Step 2301: Receive from the sender the ticket 230 which is the object of transference.

Step 2302: Perform a ticket verification procedure to verify the validity of the ticket. The ticket verification procedure is shown in detail in FIG. 25.

Step 2303: If the ticket is found valid, go to step 2305, and if not valid, go to step 2304.

Step 2304: Generate an exception event and terminate the procedure.

Step 2305: Store the received ticket on a recording medium.

Step 2306: Send acknowledgment of normal receipt of the ticket to the sender.

Figure 24:
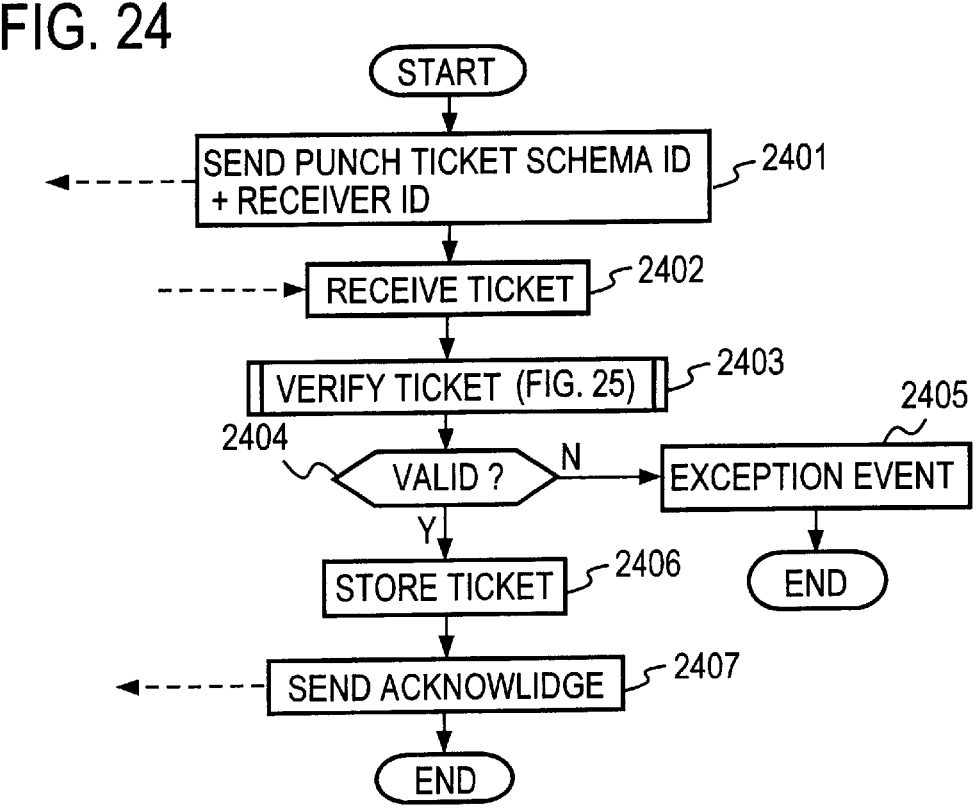
FIG. 24 is a flowchart depicting a main procedure of a punching apparatus.

FIG. 24 is a flowchart of a ticket punching procedure by the punching apparatus 107 of the service provider equipment 111 (FIG. 1).

Step 2401: Send the ticket schema ID 231 to be punched and the receiver ID to the sender.

Step 2402: Receive from the sender the ticket 230 to be punched.

Step 2403: Perform a ticket verification procedure to verify the validity of the ticket 230. The ticket verification procedure is shown in detail in FIG. 25.

Step 2404: If the ticket 230 is found valid, go to step 2406, and if not valid, go to step 2405.

Step 2405: Generate an exception event and terminate the procedure.

Step 2406: Store the received ticket on a recording medium.

Step 2407: Send acknowledgment of normal receipt of the ticket to the sender.

Figure 25:
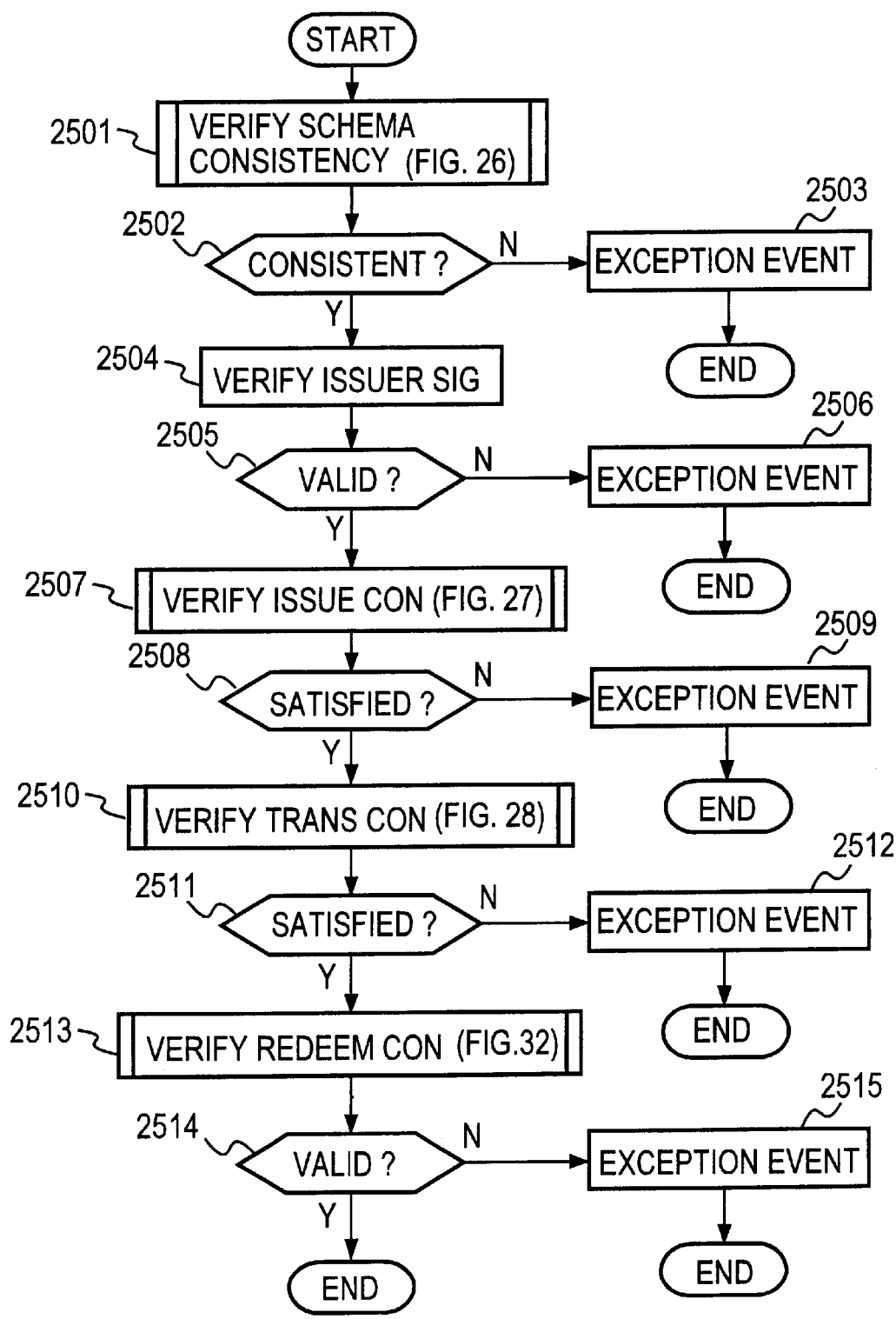
FIG. 25 is a flowchart depicting a ticket verification procedure.

FIG. 25 is a flowchart of an electronic ticket verification procedure. The ticket verification procedure is performed by the receiving apparatus 103 in the issue process, by the receiving apparatus 105 in the transfer process, and by the punching apparatus 107 in the redeem process, respectively, as described previously in connection with FIG. 1. However, the ticket verification procedure that is performed at the receiving side in each phase of the ticket circulation entails conducting the ticket verification at all steps of the ticket circulation from the ticket issuance step to the respective steps. That is, the receiving apparatus 103 of the user-1 equipment 109 performs steps 2501 through 2509 in FIG. 25 at step 2302 in FIG. 23; the receiving apparatus 105 of the user-n equipment 110 performs steps 2501 through 2509 in FIG. 25 at step 2302 in FIG. 23; and the punching apparatus 107 of the service provider equipment 111 performs steps 2501 through 2515 at step 2403 in FIG. 24.

Step 2501: Perform a schema consistency verification procedure. The schema consistency verification procedure is shown in detail in FIG. 26.

Step 2502: If the schema consistency is satisfied, go to step 2504, and if not, go to step 2503.

Step 2503: Generate an exception event and terminate the procedure.

Step 2504: Verify the validity of the issuer's signature 235 using the issuer's public key.

Step 2505: If the issuer's signature is found valid, go to step 2507, and if not valid, go to step 2506.

Step 2506: Generate an exception event and terminate the procedure.

Step 2507: Perform an issue condition verification procedure. The issue condition verification procedure is shown in detail in FIG. 27.

Step 2508: If the issue condition is satisfied, go to step 2510, and if not, go to step 2509.

Step 2509: Generate an exception event and terminate the procedure.

The ticket verification procedure of the receiving apparatus 103 terminates with this step.

Step 2510: Perform a transfer condition verification procedure. The transfer condition verification procedure is shown in detail in FIG. 29.

Step 2511: If the transfer condition is satisfied, go to step 2513, and if not satisfied, go to step 2512.

Step 2512: Generate an exception event and terminate the procedure.

The ticket verification procedure of the receiving apparatus 105 terminates with this step.

Step 2513: Perform a redeem condition verification procedure. The redeem condition verification procedure is shown in detail in FIG. 32.

Step 2514: If the redeem condition is satisfied, terminate the procedure normally. If not satisfied, go to step 2515.

Step 2515: Generate an exception event and terminate the procedure.

The punching apparatus 107 performs the entire verification procedure from step 2501 to 2515.

Figure 26:
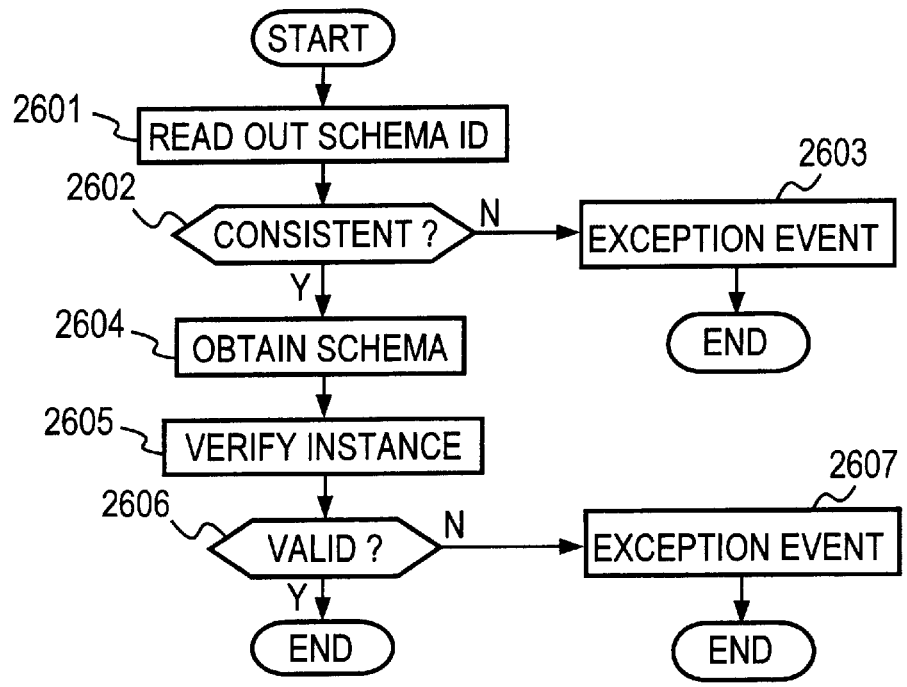
FIG. 26 is a flowchart depicting a schema consistency verification procedure.

FIG. 26 is a flowchart of the schema consistency verification procedure which is performed in step 2501 in FIG. 25.

Step 2601: Read out the schema ID 231 of the received ticker 230.

Step 2602: In the case of punching, make a check to see if the schema ID obtained in step 2601 is consistent with the schema ID required by the punching apparatus, and if consistent, go to step 2604, and if not, go to step 2603.

Step 2603: Generate an exception event and terminate the procedure.

Step 2604: Obtain the ticket schema 210 specified by the ticket schema ID 231. The ticket schema 210 can be obtained, for example, from the schema server 1401 using the HTTP protocol as described previously in respect of FIG. 14. At this time, according to applications, in order to verify the trust of the ticket schema itself, reference is made to the schema definer table 300 (FIG. 3D) or schema ID table 310 (FIG. 3E) separately obtained by the aforementioned method, thereby making a check to see if the ticket schema 210 obtained as mentioned above is defined by an definer appearing in the schema definer table 300, or if the ticket schema ID 213 of the ticket schema 210 is described in the schema ID table 310.

Step 2605: Compare the ticket skeleton 214 of the ticket schema 210 and the ticket instance 233 of the ticket 230 to verify that the ticket instance 233 is the instance of the ticket skeleton 214. More specifically, when a concrete property value is defined in the ticket skeleton 214, it is verified whether the defined property value is consistent with the property value of the ticket instance 233. As regards the properties marked with asterisks, a check is made to see if any values are defined in the ticket instance 233.

Step 2606, If the ticket instance 233 is found valid, terminate the procedure normally, and if invalid, go to step 2607.

Step 2607: Generate an exception event and terminate the procedure.

Figure 27:
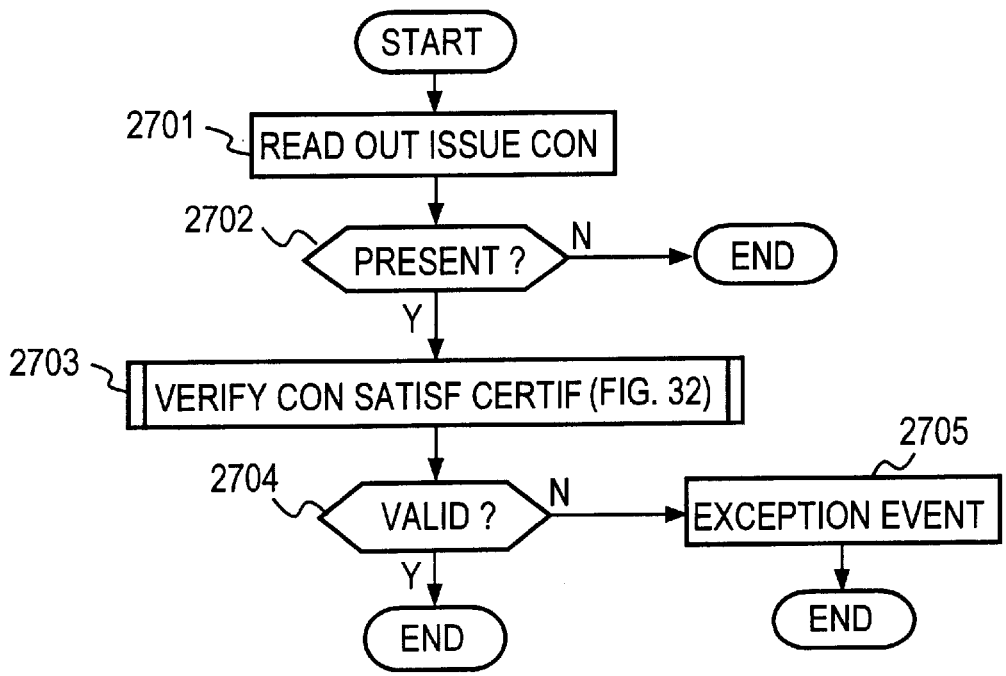
FIG. 27 is a flowchart depicting an issue condition verification procedure.

FIG. 27 is a flowchart of the issue condition verification procedure which is performed in step 2507 in FIG. 25.

Step 2701: Read out the issue condition 250.

Step 2702: If no issue condition is present, terminate the procedure normally, and if present, go to step 2703.

Step 2703: Perform a condition satisfaction certificate verification procedure using, as the input therefor, the list of sender's ticket schema ID's 251 defined in the issue condition 250. The condition satisfaction certificate verification procedure is shown in detail in FIG. 32.

Step 2704: If the condition satisfaction certificate is found valid, terminate the procedure normally, and if invalid, go to step 2705.

Step 2705: Generate an exception event and terminal the procedure.

Figure 28:
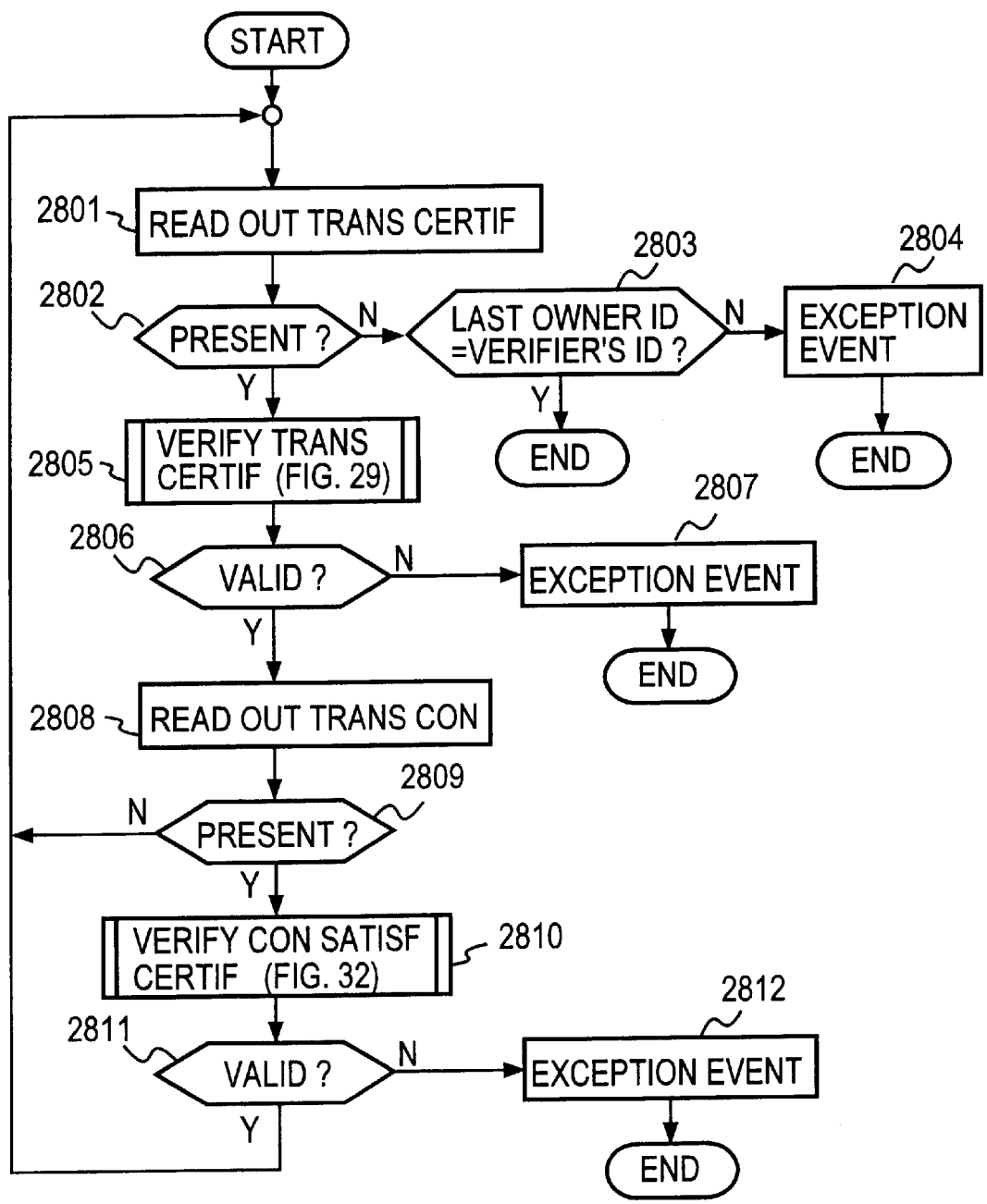
FIG. 28 is a flowchart depicting a transfer condition verification procedure.

FIG. 28 is a flowchart of the transfer condition verification procedure which is performed in step 2510 in FIG. 25.

Step 2801: Read out one of the transfer conditions 244 to 246 in the circulation certificate 236.

Step 2802: If the transfer certificate is present, go to step 2805, and if not present, make a check to see if the owner ID 234 of the tail transfer certificate is consistent with the user's own ID.

Step 2803: If the owner ID 234 is consistent with the user's own ID, normally terminate the procedure, and if not, proceed to step 2804.

Step 2804: Generate an exception event and terminate the procedure.

Step 2805: Perform a transfer certificate verification procedure, which is shown in detail in FIG. 29.

Step 2806: If the transfer certificate is found valid, go to step 2808, and if invalid, go to step 2807.

Step 2807: Generate an exception event and terminate the procedure.

Step 2808: Read out the transfer condition 260.

Step 2809: If no transfer condition is present, return to step 2801 to verify the next transfer certificate. If the transfer condition 260 is present, go to step 2810.

Step 2810: Perform a condition satisfaction verification procedure using, as the input therefor, the list of sender's ticket schema ID's 262 defined in the transfer condition 260. The condition satisfaction certificate verification procedure is shown in detail in FIG. 32.

Step 2811: If the condition satisfaction certificate is found valid, return to step 2801 to verify the next transfer certificate. If the condition satisfaction certificate is found invalid, go to step 2812.

Step 2812: Since no sender condition is satisfied, generate an exception event and terminate the procedure.

Figure 29:
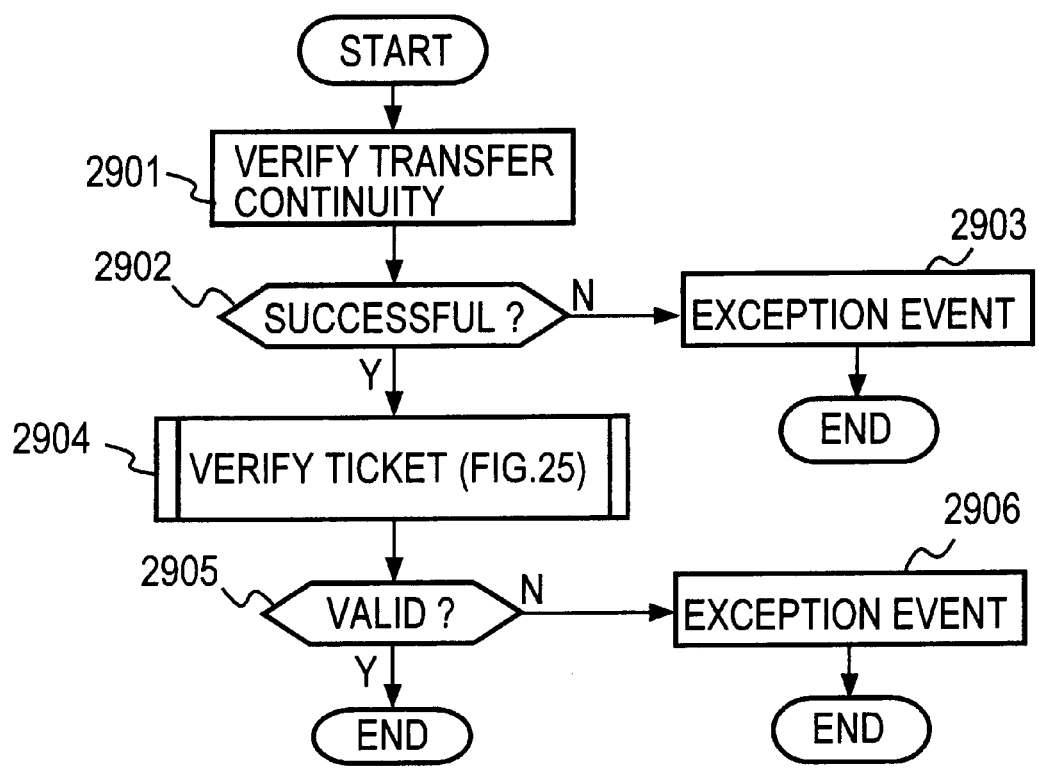
FIG. 29 is a flowchart depicting a transfer certificate verification procedure.

FIG. 29 is a flowchart of the transfer certificate verification procedure which is performed in step 2805 in FIG. 28.

Step 2901: In the case of a ticket whose owner ID is specified by the immediately preceding transfer certificate (for example, 244) or which has not been transferred so far, verify the continuity of the ticket transference by making a check to see if the owner ID of the ticket is consistent with the issuer ID of the transfer certificate.

Step 2902: If the transference continuity is found, go to step 2904, and if not, proceed to step 2903.

Step 2903: Generate an exception event and terminate the procedure.

Step 2904: Perform a ticket verification procedure using the transfer certificate as the input therefor. The ticket verification procedure is the same as depicted in FIG. 25.

Step 2905: If the ticket is found valid, terminate the procedure normally, and if not valid, go to step 2906.

Step 2906: Generate an exception event and terminate the procedure.

Figure 30:
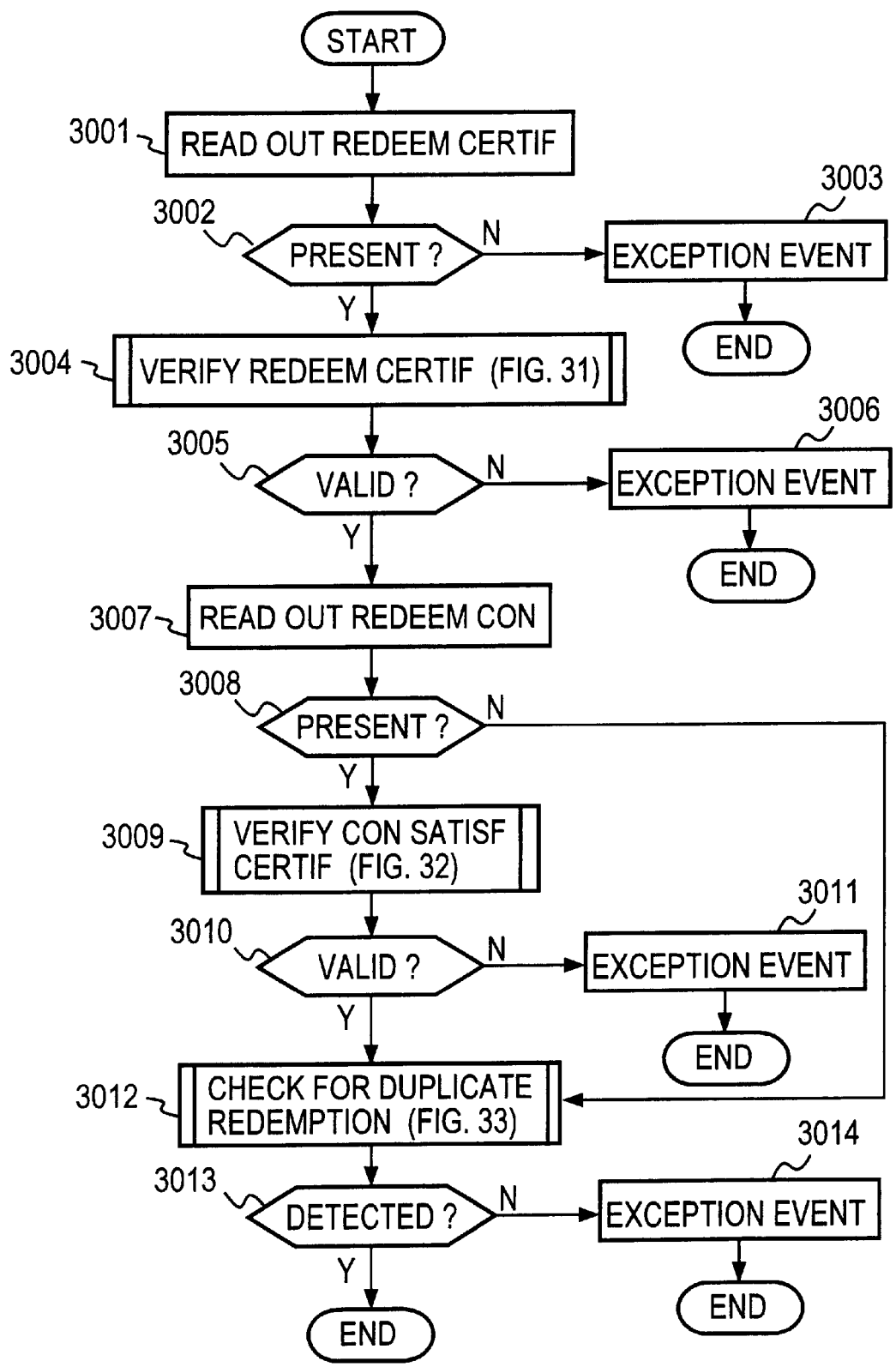
FIG. 30 is a flowchart depicting a redeem condition verification procedure.

FIG. 30 is a flowchart of the redeem condition verification procedure which is performed in step 2513 in FIG. 25.

Step 3001: Read out the redeem certificate 248 contained in the circulation certificate 236.

Step 3002: If the redeem certificate 236 is present, go to step 3004, and if not present, go to step 3003.

Step 3003: Generate an exception event and terminate the procedure.

Step 3004: Perform a redeem certificate verification procedure, which is shown in detail in FIG. 31.

Step 3005: If the redeem certificate is found valid, go to step 3007, and if not valid, go to step 3006.

Step 3006: Generate an exception event and terminate the procedure.

Step 3007: Read out the redeem condition 270.

Step 3008: If the redeem condition is not present, go to step 3012, and if present, go to step 3009.

Step 3009: Perform a condition satisfaction certificate verification procedure using, as the input therefor, the list of sender's ticket schema ID's 274 defined in the redeem condition 270. The condition satisfaction certificate verification procedure is shown in detail in FIG. 32.

Step 3010: If the condition satisfaction certificate is found valid, go to step 3012, and if not valid, go to step 3011.

Step 3011: Generate an exception event and terminate the procedure.

Step 3012: Perform a duplicate redemption checking procedure, which is shown in detail in FIG. 33.

Step 3013: If no fraud is found, terminate the procedure normally, and if a fraud is found, go to step 3014.

Step 3014: Generate an exception event and terminate the procedure.

Figure 31:
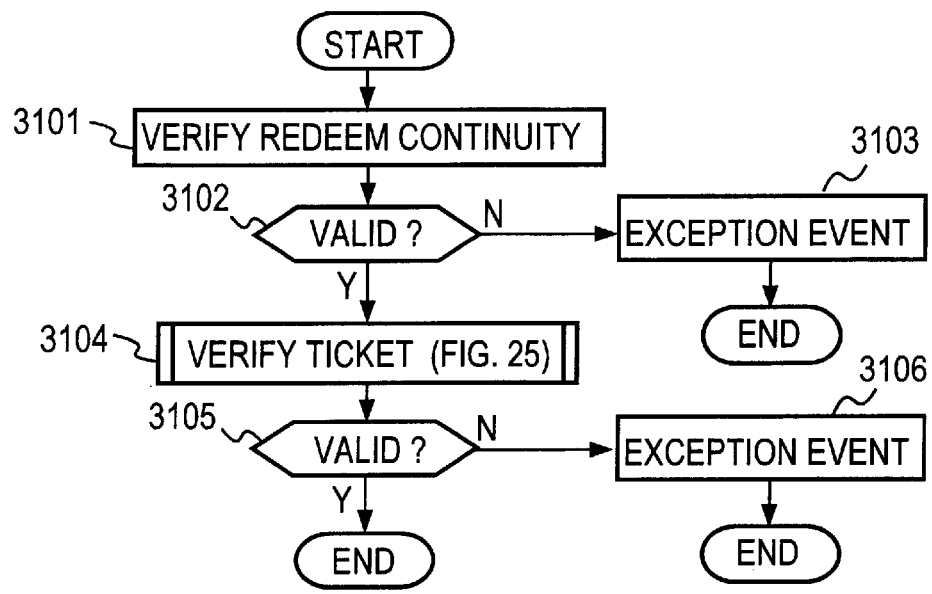
FIG. 31 is a flowchart depicting a redeem certificate verification procedure.

FIG. 31 is a flowchart of the redeem certificate verification procedure which is performed in step 3004 in FIG. 30.

Step 3101: In the case of a ticket whose owner ID is the owner ID 1017 specified by the ultimate transfer certificate 246 (FIG. 2A, and more specifically, FIG. 10) or which has not been transferred so far, verify the transference continuity by making a check to see if the owner ID of the ticket is consistent with the issuer ID of the redeem certificate.

Step 3102: If the transference continuity is found, go to step 3104, and if not, go to step 3103.

Step 3103: Generate an exception event and terminate the procedure.

Step 3104: Perform a ticket verification procedure using the redeem certificate as the input thereof. The ticket verification procedure is shown in detail in FIG. 25.

Step 3105: If the ticket is found valid, terminate the procedure normally, and if invalid, go to step 3106.

Step 3106: Generate an exception event and terminate the procedure.

Figure 32:
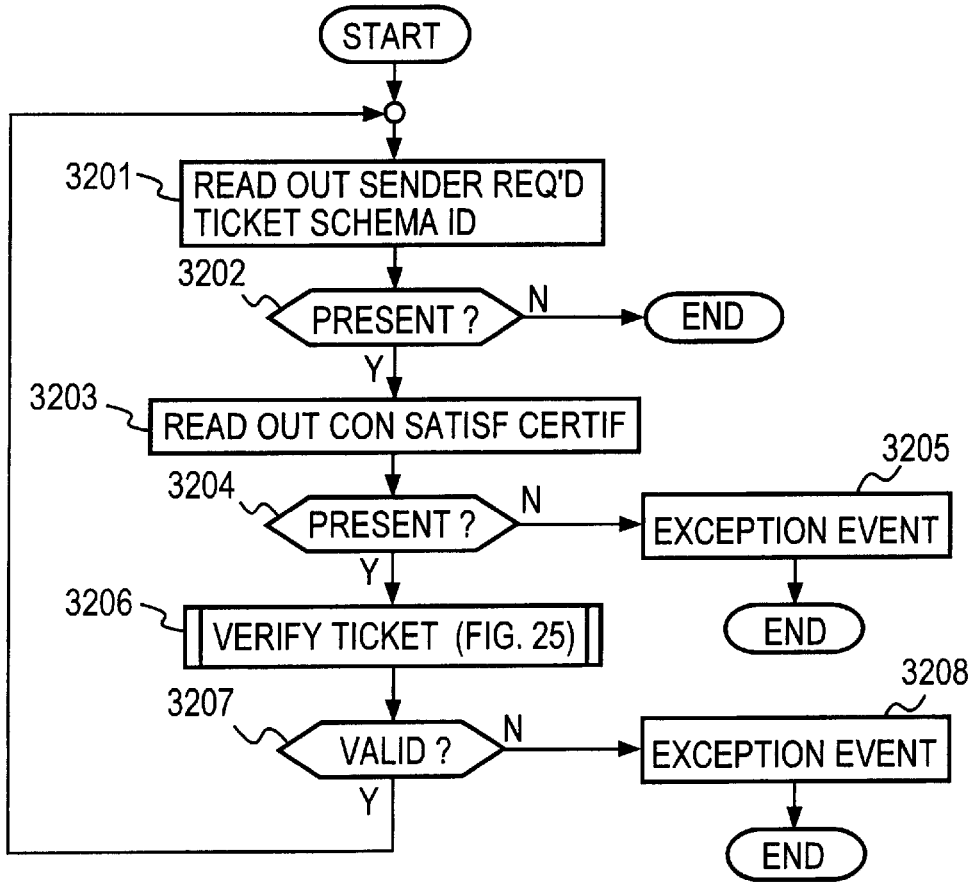
FIG. 32 is a flowchart depicting a condition satisfaction certificate verification procedure.

FIG. 32 is a flowchart of the condition satisfaction certificate verification procedure which is performed in step 2810 in FIG. 28 and in step 3009 in FIG. 30.

Step 3201: Read out one of unverified sender's ticket schema ID's from the list of sender's ticket schema ID's.

Step 3202: If no unverified sender's ticket schema ID is present, terminate the procedure normally, and if present, go to step 3203:

Step 3203: Read out the condition satisfaction certificate specified by the sender's requested ticket schema ID.

Step 3204: If the specified condition satisfaction certificate is present, go to step 3206, and if not present, go to step 3205.

Step 3205: Since the sender condition is not satisfied, generate an exception event and terminate the procedure.

Step 3206: Perform a ticket verification for the condition satisfaction certificate to verify its validity. The ticket verification procedure is shown in detail in FIG. 25.

Step 3207: If the ticket is found valid, return to step 3201 to verify the sender condition by the next sender's ticket schema ID. If the ticket is found invalid, go to step 3208.

Step 3208: Since the sender condition is not satisfied, generate an exception event and terminate the procedure.

Figure 33:
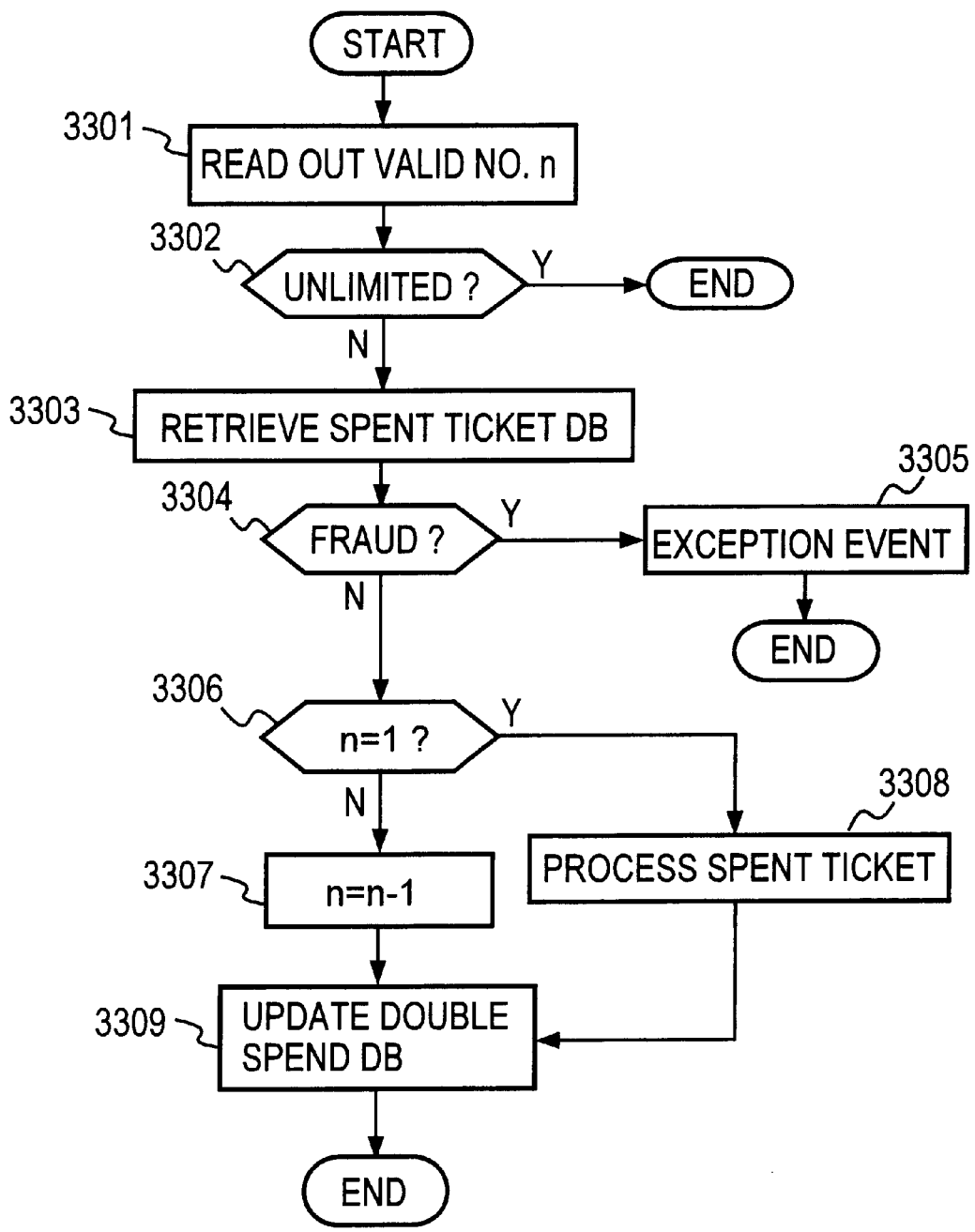
FIG. 33 is a flowchart depicting a duplicate redemption checking procedure.

FIG. 33 is a flowchart of the duplicate redemption checking procedure which is performed in step 3012 in FIG. 32.

Step 3301: Read out the valid number of times 272 in the redeem condition 270.

Step 3302: In the case of a ticket which has an unlimited valid number of times 272, such as a transportation pass or gate card, terminate the ticket redeem procedure. Otherwise, go to step 3303.

Step 3303: Retrieve a duplicate redemption checking DB using the ticket ID to check whether the ticket has already been used. The duplicate redemption checking DB has stored therein ticket ID's of tickets already spent within their terms of validity. As for tickets which are used a limited number of times, such as coupon tickets, the duplicate redemption checking DB manages the remaining valid numbers of times and detects the fraudulent use of expired tickets.

This example employs an online duplicate redemption checking method, but when it is possible to protect against fraud by using a smart card or similar tamper-proof devices, this processing can be omitted or may also be performed online afterward as auxiliary means for providing increased security. When this processing is omitted, the ticket ID 232 is unnecessary, and hence it can be omitted.

The duplicate redemption check can also be made using an individual server for each type of ticket, or using a general-purpose service as by a duplicate redemption checking device 1602 depicted in FIG. 16.

Step 3304: If no fraud is detected by the duplicate redemption checking procedure, go to step 3306, and if a fraud is detected, go to step 3305.

Step 3305: Generate an exception event and terminate the procedure.

Step 3306: In the case of a ticket which can be used only once, such as a concert ticket or train ticket, or in the case of a ticket which can be used a specified number of times, such as a coupon ticket or prepaid card, make a check to see if the remaining number of times is 1.

Step 3307: When the remaining number of counts is 2 or more, decrement the remaining valid number of times 272 by 1 and go to step 3309.

Step 3308: When the remaining number of counts is 1, make the ticket status "spent" and go to step 3309.

Step 3309: Update the duplicate redemption checking DB and terminate the procedure.

Next, a description will be given of the issuing apparatus 102, the receiving apparatus 103 and 105, the transferring apparatus 104, the redeeming apparatus 106 and the punching apparatus 107 in the system of FIG. 1 which implements the electronic ticket circulation system according to the present invention.

Figure 34:
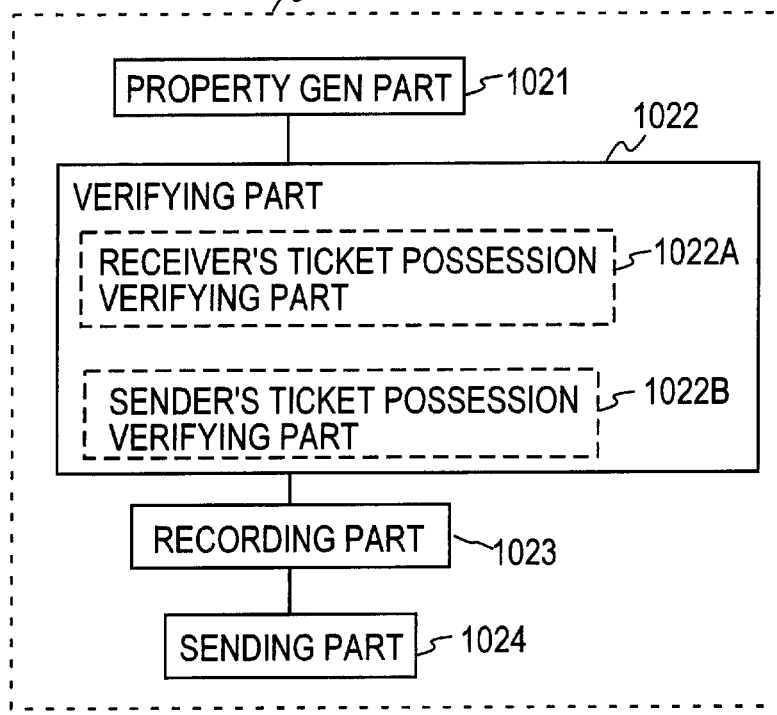
FIG. 34 is a block diagram illustrating the functional configuration of the issuing apparatus.

The issuing apparatus 102 depicted in FIG. 34 comprises a property generating part 1021, a verifying part 1022, a recording part 1023, and a sending part 1024. The verifying part 1022 is composed of a sender's ticket possession verifying part 1022B and a receiver's ticket possession verifying part 1022A. Based on the information input thereinto, the property generating part 1021 writes, in the electronic format of FIG. 2A, such property values as the identifier of the electronic ticket issuer, the rights information of the ticket, the ticket issue condition, the identifier of the ticket owner, etc. into a recording medium, thereby creating an electronic ticket. The recording medium on which the electronic ticket is written may be an externally installed or built-in recording medium.

The receiver's ticket possession verifying part 1022A verifies whether the receiver has the ticket, specified in the issue condition recorded in the electronic ticket, that the receiver is required to have for receiving the electronic ticket. The sender's ticket possession verifying part 1022B verifies whether the sender has the ticket, specified in the issue condition recorded in the electronic ticket, that the sender is required to have for sending the electronic ticket.

The recording part 1023 records the issue condition satisfaction certificate in the electronic ticket when it is verified by the verifying part 1022 that the electronic ticket satisfies the issue condition. This electronic ticket is sent from the sending part 1024 to the receiver.

Figure 35:
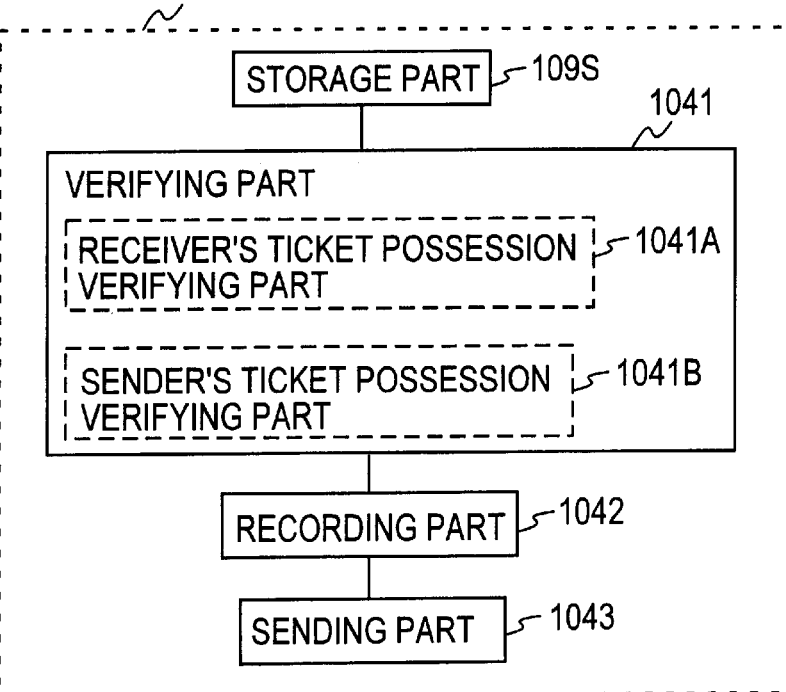
FIG. 35 is a block diagram illustrating the functional configuration of the transferring apparatus.

The transferring apparatus 104 depicted in FIG. 35 comprises a storage part 109S, a verifying part 1041, a recording part 1042 and a sending part 1043. The verifying part 1041 is composed of a receiver's ticket possession verifying part 1041A and a sender's ticket possession verifying part 1041B. As depicted in FIG. 1, the storage part 109S is used by the receiving apparatus 103 as well.

The electronic ticket read out of the storage part 109S is provided to the verifying part 1041. The receiver's ticket possession verifying part 1041A verifies whether the receiver has the ticket, specified in the transfer condition recorded in the electronic ticket, that the receiver is required to have for receiving the electronic ticket. The sender's ticket possession verifying part 1041B verifies whether the sender has the ticket, specified in the transfer condition recorded in the electronic ticket, that the sender is required to have for sending the electronic ticket.

The recording part 1042 records a transfer certificate and the transfer condition satification certificate in the electronic ticket when it is verified by the verifying part 1041 that the electronic ticket satisfies the transfer condition. This electronic ticket is sent from the sending part 1043 to the receiver.

Figure 36:
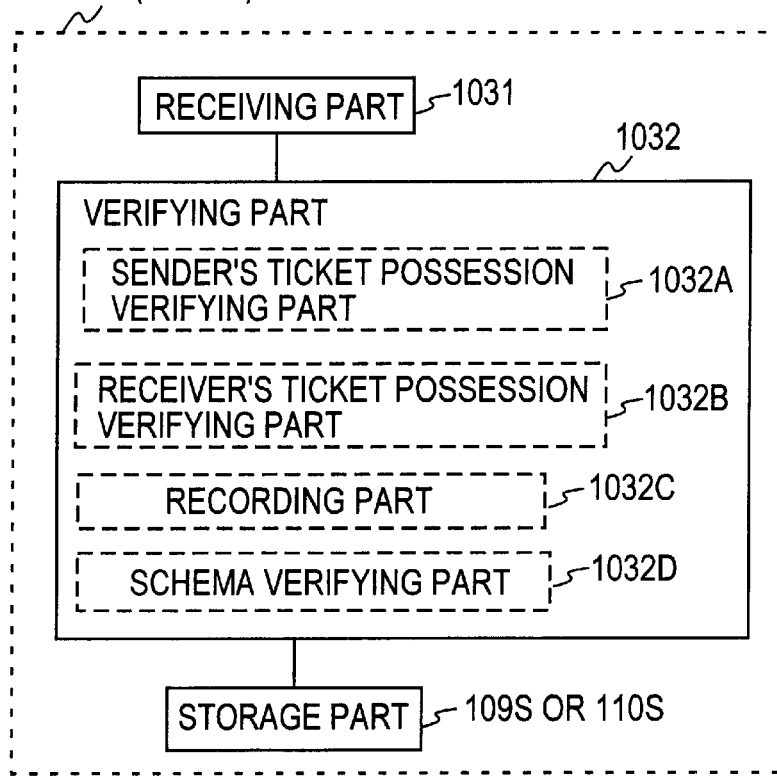
FIG. 36 is a block diagram illustrating the functional configuration of the receiving apparatus.

While the receiving apparatus depicted in FIG. 36 is applied to either of the receiving apparatus 103 for receiving the electronic ticket from the issuing apparatus 102 and the receiving apparatus 105 for receiving the electronic ticket from the transferring apparatus 104 as shown in FIG. 1. The receiving apparatus 103 comprises a receiving part 1031, a verifying part 103 2, and a storage part 109S. the verifying part 1032 is made up of a sender's ticket possession verifying part 1032A, a receiver's ticket possession verifying part 1032B, a ticket verifying part 1032C, and a schema verifying part 1032D.

The electronic ticket received by the receiving part 1031 is subjected to the following verification by the verifying part 1032. The sender's ticket possession verifying part 1032A verifies whether the sender has the ticket, specified in the issue condition (the transfer condition in the case of the receiving apparatus 105) recorded in the electronic ticket, that the sender is required to have for sending the electronic ticket. The receiver's ticket possession verifying part 1032B verifies whether the receiver has the ticket, specified in the issue condition recorded in the electronic ticket, that the receiver is required to have for receiving the electronic ticket.

The ticket verifying part 1032C verifies the issuer's signature and the issue condition satisfaction certificate (a transfer certificates and the transfer condition satisfaction certificates in the case of the receiving apparatus 105) recorded by the electronic ticket sender in the electronic ticket. The schema verifying part 1032D verifies whether the schema definer identifier of the electronic ticket is recorded on the schema definer table with a schema definer identifier recorded for each right type of the electronic ticket. An alternative to this is to verify whether the schema of the electronic ticket is recorded on the schema identifier table with a ticket schema identifier recorded for each right type of the electronic ticket.

When it is verified by the verifying part 1032 that the abovementioned requirements are all satisfied, the electronic ticket is stored in the storage part 111S until it is transferred to others.

Figure 37:
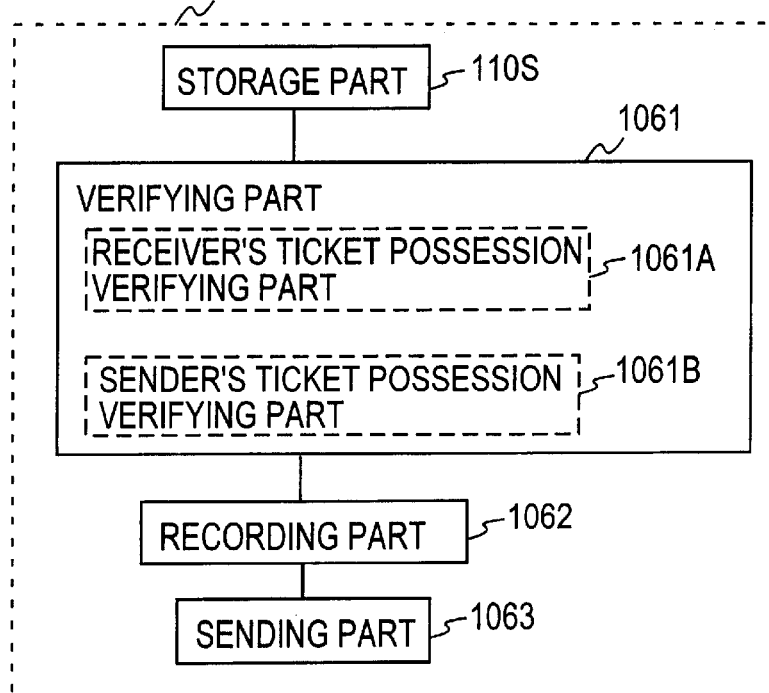
FIG. 37 is a block diagram illustrating the functional configuration of the redeeming apparatus.

The redeeming apparatus 106 depicted in FIG. 37 comprises a storage part 110S, a verifying part 1061, a redeem condition satisfaction certificate recording device 1062 and a sending part 1063. The verifying part 1061 is composed of a receiver's ticket possession verifying part 1061A and a sender's ticket possession verifying part 1061B. The storage part 1105 is used by the receiving apparatus 105 as well in FIG. 1.

The electronic ticket read our of the storage part 110S is provided to the verifying part 1061. The receiver's ticket possession verifying part 1061A verifies whether the receiver has the ticket, specified in the redeem condition recorded in the electronic ticket, that the receiver is required to have for receiving the electronic ticket. The sender's ticket possession verifying part 1061B verifies whether the sender has the ticket, specified in the redeem condition recorded in the electronic ticket, that the sender is required to have for sending the electronic ticket.

The recording part 1062 records a redeem certificate and the redeem condition satisfaction certificate in the electronic ticket when it is verified by the verifying part 1061 that the electronic ticket satisfies the redeem condition. This electronic ticket is sent from the sending part 1063 to the receiver.

Figure 38:
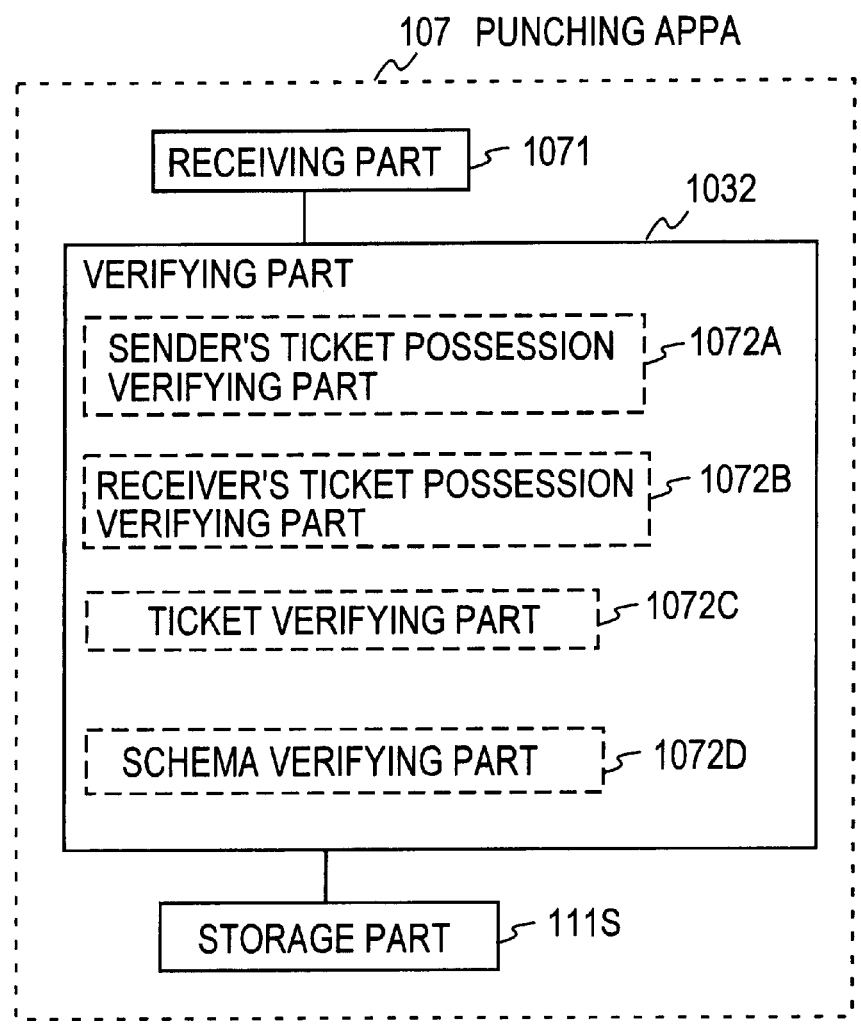
FIG. 38 is a block diagram illustrating the functional configuration of the punching apparatus.

The punching apparatus 107 depicted in FIG. 38 comprises a receiving part 1071, a verifying part 1072, and a storage part 111S. The verifying part 1072 is composed of a sender's ticket possession verifying part 1072A, a receiver's ticket possession verifying part 1072B, a ticket verifying part 1072C, and a schema verifying part 1072D.

The sender's ticket possession verifying part 1072A verifies whether the sender has the ticket, specified in the redeem condition recorded in the electronic ticket provided from the receiving part 1071, that the sender is required to have for sending the electronic ticket. The receiver's ticket possession verifying part 1072B verifies whether the receiver has the ticket, specified in the redeem condition recorded in the electronic ticket, that the receiver is required to have for receiving the electronic ticket.

The ticket verifying part 1072C verifies the issuer's signature, the issue condition satisfaction certificate, the transfer certificates, the transfer condition satisfaction certificates, the redeem certificate and the redeem condition satisfaction certificate recorded in the electronic ticket. The schema verifying part 1072D verifies whether the schema definer identifier of the electronic ticket is recorded on the schema definer table with a schema definer identifier recorded thereon for each right type of the electronic ticket. An alternative to this is to verify whether the schema of the electronic ticket is recorded on the schema identifier table with a ticket schema identifier recorded thereon for each right type of the electronic ticket.

When it is verified by the verifying part 1072 that the abovementioned requirements are all satisfied, the electronic ticket is stored in the storage part 111S.

The processing by the electronic ticket issuing, transferring, receiving, redeeming and punching apparatus described above can be carried out by reading out, interpreting and executing programs by means of a computer.

The main points of the present invention may be summarized as follows:

(1) The rights information 230 which defines diverse rights information that differs with individual ticket applications, the ticket issue, transfer and redeem conditions 240, 241 and 242 can be defined in the ticket 230.

(2) The rights information structure definition 218 which defines the kinds and meanings of diverse rights information that differ with individual ticket applications, the electronic ticket issue, transfer and redeem conditions 219, 220 and 221 can be defined in the ticket schema 210.

(3) the identifier 231 of the ticket schema of the above structure can be defined in the electronic ticket 230 of the above structure.

(4) The method for defining the ticket of the above structure comprises: condition satisfaction certificate recording parts 243, 245, 247 and 249 for certifying the satisfaction of the ticket issue, transfer and redeem conditions. As a result, it is possible to verify, prior to receiving or punching a ticket, that the ticket has undergone valid transactions so far.

(5) The ticket issuing apparatus 102 has means for recording property values of the electronic ticket based on the definitions of the ticket schema, and means for verifying the issue conditions recorded in the condition recording part. As a result, tickets with diverse circulation conditions can be issued by a common issuing apparatus.

(6) The ticket transferring apparatus 104 comprises: means for verifying whether the ticket transfer condition is satisfied; means for recording a transfer certificate in the transfer certificate recording part when the transfer condition is satisfied; and means for sending the ticket to the transferee. As a result, tickets with diverse circulation conditions can be transferred by a common transferring apparatus.

(7) The ticket receiving apparatus 103 (105) comprises: and means for verifying whether the transfer condition satisfaction certificate satisfies the transfer condition recorded in the transfer condition recording part. As a result, tickets with diverse circulation conditions can be received by a common receiving apparatus.

(8) The ticket redeeming apparatus 106 comprises: means for verifying whether the redeem condition of the ticket defined by the abovementioned ticket defining method is satisfied; and means for sending the ticket to the service provider. As a result, tickets with diverse circulation conditions can be redeemed by a common redeeming apparatus.

(9) The ticket punching apparatus 107 comprises: means for verifying whether the redeem condition recorded in the redeem condition recording part. As a result, tickets with diverse circulation conditions can be punched by a common punching apparatus.

While in the above the issue, transfer and redeem conditions have been described to use, only one of them is enough to carry out the invention.

Effect of the Invention

As described above, according to the present invention, the rights information structure definitions which defines the kinds and meanings of properties of diverse rights information that differs with ticket applications, and the various ticket issue, transfer and redeem conditions which differ with the ticket applications are defined in the ticket schema which defines the electronic ticket structure or in the electronic ticket itself. Accordingly, the issuing, receiving, transferring, redeeming and punching apparatuses, which process the electronic ticket, are allowed to perform the processing while interpreting the above conditions. As the result of this, diverse tickets with various circulation tickets can be processed by common issuing, receiving, transferring, redeeming and punching apparatuses. This avoids the necessity of developing individual ticket information readout software and transaction systems for different types of tickets, permitting substantial reduction of development costs.

It will be apparent that many modifications and variations may be effected without departing from the scope of the novel concepts of the present invention.

What is claimed is:

1. An apparatus for redeeming electronic tickets for various services which comprises an issuer identifier recording part for recording an identifier of an electronic ticket issuer, a right information recording part for recording right information of said electronic ticket; a condition recording part for recording a redeem condition of said electronic ticket, an owner identifier recording part for recording an identifier of an electronic ticket owner, and a signature recording part for recording a signature of said issuer, said condition recording part having a qualification condition defining part for specifying, as said redeem condition, a ticket that an electronic ticket receiver is required to possess, said qualification condition defining part defining, as said redeem condition, a schema identifier which specifies the schema of a ticket that said electronic ticket receiver is required to possess, said redeeming apparatus comprising:

means for verifying whether said electronic ticket receiver possesses said ticket specified by said schema identifier in said qualification condition defining part; and means for sending said electronic ticket to said electronic ticket receiver when it is verified by said verifying means that said electronic ticket receiver possesses said specified ticket.

2. The redeeming apparatus of claim 1, wherein said qualification condition defining part defines, as said redeem condition, a second schema identifier which specifies the schema of a ticket that an electronic ticket sender is required to possess, and said verifying means includes means for verifying whether said electronic ticket sender possesses said ticket of said schema specified by said second schema identifier defined in said qualification condition defining part.

3. The redeeming apparatus of claim 2, wherein said electronic ticket includes a redeem condition satisfaction certificate recording part for recording a redeem condition satisfaction certificate which certifies the satisfaction of said redeem condition, said redeeming apparatus further comprising means for recording said redeem condition satisfaction certificate in said redeem condition satisfaction certificate recording part when the presence of said ticket of said schema specified by said schema identifier defined in said qualification condition defining part is verified by said verifying means.

4. An apparatus for redeeming electronic tickets for various services which comprises an issuer identifier recording part for recording an identifier of an electronic ticket issuer, a right information recording part for recording right information of said electronic ticket; a condition recording part for recording a redeem condition of said electronic ticket, an owner identifier recording part for recording an identifier of an electronic ticket owner, and a signature recording part for recording a signature of said issuer, said condition recording part having a qualification condition defining part for specifying, as said redeem condition, a ticket that an electronic ticket receiver is required to possess, said qualification condition defining part defining, as said redeem condition, a schema identifier which specifies the schema of said ticket that said electronic ticket receiver is required to possess, said redeeming method comprising the steps of:

(a) verifying whether said electronic ticket receiver possesses said ticket specified by said schema identifier in said qualification condition defining part; and (b) sending said electronic ticket to said electronic ticket receiver when it is verified by said step (a) that said electronic ticket receiver possesses said specified ticket.

5. The redeeming method of claim 4, wherein said qualification condition defining part defines, as said redeem condition, a second schema identifier which specifies the schema of a ticket that an electronic ticket sender is required to possess, and said step (a) includes the step of verifying whether said electronic ticket sender possesses said ticket of said schema specified by said second schema identifier defined in said qualification condition defining part.

6. The redeeming method of claim 5, wherein said electronic ticket includes a redeem condition satisfaction certificate recording part for recording a redeem condition satisfaction certificate which certifies the satisfaction of said redeem condition, and said step (a) includes the step of recording said redeem condition satisfaction certificate in said redeem condition satisfaction certificate recording part when the presence of said ticket of said schema specified by said schema identifier defined in said qualification condition defining part is verified.

7. A computer-readable recording medium having recorded thereon, as a program for execution by a computer, a method for redeeming electronic tickets for various services which comprises an issuer identifier recording part for recording an identifier of an electronic ticket issuer, a right information recording part for recording right information of said electronic ticket; a condition recording part for recording a redeem condition of said electronic ticket, an owner identifier recording part for recording an identifier of an electronic ticket owner, and a signature recording part for recording a signature of said issuer, said condition recording part having a qualification condition defining part for specifying, as said redeem condition, a ticket that an electronic ticket receiver is required to possess, said qualification condition defining part defining, as said redeem condition, a schema identifier which specifies the schema of said ticket that said electronic ticket receiver is required to possess, said program comprising the steps of:

(a) verifying whether said electronic ticket receiver possesses said ticket specified by said schema identifier in said qualification condition defining part; and (b) sending said electronic ticket to said electronic ticket receiver when it is verified by said step (a) that said electronic ticket receiver possesses said specified ticket.

8. The recording medium of claim 7, wherein said qualification condition defining part defines, as said redeem condition, a second schema identifier which specifies the schema of a ticket that an electronic ticket sender is required to possess, and said step (a) includes the step of verifying whether said electronic ticket sender possesses said ticket of said schema specified by said second schema identifier defined in said qualification condition defining part.

9. The recording medium of claim 8, wherein said electronic ticket includes a redeem condition satisfaction certificate recording part for recording a redeem condition satisfaction certificate which certifies the satisfaction of said redeem condition, and said step (a) includes the step of recording said redeem condition satisfaction certificate in said redeem condition satisfaction certificate recording part when the presence of said ticket of said schema specified by said schema identifier defined in said qualification condition defining part is verified.

\* \* \* \* \*